United States Patent
Seo et al.

(10) Patent No.: US 9,722,756 B2
(45) Date of Patent: *Aug. 1, 2017

(54) METHOD AND DEVICE FOR ALLOCATING RESOURCE FOR UPLINK CONTROL CHANNEL IN WIRELESS COMMUNICATION SYSTEM

(71) Applicant: LG ELECTRONICS INC., Seoul (KR)

(72) Inventors: Dongyoun Seo, Seoul (KR); Hanbyul Seo, Seoul (KR); Hyukjin Chae, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,726

(22) Filed: May 3, 2016

(65) Prior Publication Data

US 2016/0248571 A1    Aug. 25, 2016

Related U.S. Application Data

(63) Continuation of application No. 14/406,722, filed as application No. PCT/KR2013/005921 on Jul. 3, 2013, now Pat. No. 9,363,803.

(Continued)

(51) Int. Cl.
*H04W 4/00* (2009.01)
*H04L 5/00* (2006.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

| | | | |
|---|---|---|---|
| 2010/0046465 | A1 | 2/2010 | Dang et al. |
| 2010/0195629 | A1 | 8/2010 | Chen et al. |

(Continued)

FOREIGN PATENT DOCUMENTS

| | | |
|---|---|---|
| EP | 2077677 | 7/2009 |
| JP | 2012-124741 | 6/2012 |

(Continued)

OTHER PUBLICATIONS

European Patent Office Application Serial No. 13812633.9, Search Report dated Jan. 26, 2016, 9 pages.

(Continued)

*Primary Examiner* — Anh-Vu Ly
(74) *Attorney, Agent, or Firm* — Lee, Hong, Degerman, Kang & Waimey

(57) ABSTRACT

Provided are a method and a device for allocating a resource for an uplink control channel in a wireless communication system. The method for allocating a resource for an uplink control channel in a wireless communication system comprises: receiving at least one downlink subframe; and allocating a physical uplink control channel (PUCCH) resource for transmitting an acknowledgement/not-acknowledgement (ACK/NACK) for the at least one downlink subframe, wherein the PUCCH resource is allocated on the basis of a control channel element of a control channel for scheduling each of the at least one downlink subframe, and if a particular subframe that satisfies a particular condition is included in the at least one downlink subframe, a control (Continued)

channel element included in the special subframe is excluded from the control channel element used to allocate the PUCCH resource.

10 Claims, 21 Drawing Sheets

Related U.S. Application Data

(60) Provisional application No. 61/667,941, filed on Jul. 3, 2012, provisional application No. 61/719,943, filed on Oct. 29, 2012, provisional application No. 61/721,508, filed on Nov. 2, 2012.

(51) Int. Cl.
  *H04L 1/18* (2006.01)
  *H04L 5/14* (2006.01)
  *H04W 72/04* (2009.01)

(52) U.S. Cl.
  CPC ......... *H04L 5/1469* (2013.01); *H04W 72/042* (2013.01); *H04W 72/0413* (2013.01); *H04L 5/001* (2013.01); *H04L 5/0016* (2013.01); *H04L 5/0053* (2013.01)

(56) References Cited

U.S. PATENT DOCUMENTS

| | | | | |
|---|---|---|---|---|
| 2011/0292900 | A1* | 12/2011 | Ahn | H04L 1/1607 370/329 |
| 2013/0064216 | A1* | 3/2013 | Gao | H04L 5/0016 370/330 |
| 2014/0022967 | A1 | 1/2014 | Yang | H04L 1/1861 370/280 |
| 2015/0103705 | A1 | 4/2015 | Yang | H04L 1/1861 370/280 |
| 2015/0124667 | A1 | 5/2015 | Yang et al. | |

FOREIGN PATENT DOCUMENTS

| | | |
|---|---|---|
| KR | 10-2012-0070345 | 6/2012 |
| WO | 2010/050234 | 5/2010 |
| WO | 2012/030097 | 3/2012 |
| WO | 2012/057571 | 5/2012 |
| WO | 2012/070839 | 5/2012 |

OTHER PUBLICATIONS

Japan Patent Office Application Serial No. 2015-518346, Office Action dated Jan. 5, 2016, 2 pages.
NTT Docomo, "PDSCH HARQ Timing of SCell and PUCCH Collision for Cross-Carrier Scheduling," 3GPP TSG RAN WG1 Meeting #69, R1-121972, May 2012, 4 pages.
LG Electronics, "Discussion on PUCCH Resource for ePDCCH," 3GPP TSG RAN WG1 Meeting #69, R1-122314, May 2012, 2 pages.
Catt, "Reference signals and transmission schemes for additional TDD special subframe configuration," 3GPP TSG RAN WG1 Meeting #69, R1-122053, May 2012, 2 pages.
Korean Intellectual Property Office Application Serial No. 10-2014-7034581, Office Action dated Aug. 5, 2015, 4 pages.
PCT International Application No. PCT/KR2013/005921, Written Opinion of the International Searching Authority dated Oct. 25, 2013, 1 page.

* cited by examiner

METHOD AND DEVICE FOR ALLOCATING RESOURCE FOR UPLINK CONTROL CHANNEL IN WIRELESS COMMUNICATION SYSTEM

CROSS-REFERENCE TO RELATED APPLICATIONS

This application is a continuation of U.S. patent application Ser. No. 14/406,722, filed on Dec. 9, 2014, now U.S. Pat. No. 9,363,803, which is the National Stage filing under 35 U.S.C. 371 of International Application No. PCT/KR2013/005921, filed on Jul. 3, 2013, which claims the benefit of U.S. Provisional Application Nos. 61/667,941, filed on Jul. 3, 2012, 61/719,943, filed on Oct. 29, 2012 and 61/721,508, filed on Nov. 2, 2012, the contents of which are all hereby incorporated by reference herein in their entirety.

BACKGROUND OF THE INVENTION

Field of the Invention

The present invention relates to wireless communication and, more particularly, to a method and a device for allocating a resource for an uplink control channel in a wireless communication system.

Related Art

A wireless communication system may use a hybrid automatic repeat request (HARQ). The HARQ is a scheme where a transmitter transmits data and then receivers ACK/NACK (acknowledgement/not-acknowledgement) being reception confirmation information with respect to the data, transmits new data or retransmits the transmitted data according to the ACK/NACK.

3GPP (3rd Generation Partnership Project) LTE (long term evolution)/LTE-A (long term evolution-advanced) may transmit the ACK/NACK through a PUCCH (physical uplink control channel) being an uplink control channel. When the ACK/NACK is transmitted through the PUCCH, a resource (PUCCH resource) configuring the PUCCH may be implicitly or explicitly determined. For example, the PUCCH resource may be determined based on a resource occupied by a PDSCH (physical downlink shared channel) being a target of the ACK/NACK response or a control channel scheduling data (transmission block or code-word). Such a PUCCH resource refers to an implicit PUCCH resource. Meanwhile, a case of explicitly indicating and using one or a plurality of resource according to a higher-layer signal refers to an explicit PUCCH resource.

Meanwhile, the number of user equipments (UEs) to be supported by the wireless communication system is increased. Due to this, an existing control channel is expected to be insufficient. In order to solve the problem, introduction of a new control channel is considered.

The new control channel is called an enhanced-physical downlink control channel (E-PDCCH) in an LTE-A. Unlike a PDCCH being an existing control channel is transmitted from a control region of a subframe, the E-PDCCH is transmitted from a data region of a subframe. Further, unlike the PDCCH is decoded based on a cell specific reference signal, the E-PDCCH may be decoded based on a UE specific reference signal.

When the E-PDCCH is introduced, a method of allocating an implicit PUCCH resource for transmitting ACK/NACK according to the related art is necessary to be corrected. This is because the E-PDCCH may be transmitted under a condition different from that of the PDCCH.

SUMMARY OF THE INVENTION

The present invention provides a method and a device for allocating a resource for an uplink control channel in a wireless communication system.

In an aspect, a method for allocating a resource for an uplink control channel in a wireless communication system, the method including: receiving at least one downlink subframe; and allocating a physical uplink control channel (PUCCH) resource for transmitting an acknowledgement/not-acknowledgement (ACK/NACK) for the at least one downlink subframe, wherein the PUCCH resource is allocated on the basis of a control channel element of a control channel for scheduling each of the at least one downlink subframe, and if a particular subframe that satisfies a particular condition is included in the at least one downlink subframe, a control channel element included in the particular subframe is excluded from the control channel element used to allocate the PUCCH resource.

In another aspect, an apparatus for allocating a resource for an uplink control channel in a wireless communication system includes: a radio frequency (RF) unit to transmit and receive a wireless signal; and a processor connected to the RF unit, wherein the processor receives at least one downlink subframe; and allocates a physical uplink control channel (PUCCH) resource for transmitting an acknowledgement/not-acknowledgement (ACK/NACK) for the at least one downlink subframe, wherein the PUCCH resource is allocated on the basis of a control channel element of a control channel for scheduling each of the at least one downlink subframe, and if a particular subframe that satisfies a particular condition is included in the at least one downlink subframe, a control channel element included in the particular subframe is excluded from the control channel element used to allocate the PUCCH resource.

According to the present invention, when an E-PDCCH is introduced in the wireless communication system, the PUCCH resource may be allocated without consuming a wireless resource and ACK/NACK can be transmitted using the allocated PUCCH resource.

DESCRIPTION OF EXEMPLARY EMBODIMENTS

User Equipment (UE) may be fixed or mobile, and may be called other terms such as an MS (mobile station), an MT (mobile UE), a UT (user UE), an SS (subscriber station), a wireless device, a PDA (personal digital assistant), a wireless modem, a handheld device, and the like.

Generally, a base station means a fixed station communicating with the UE, and may be called as other terms such as an eNB (evolved-NodeB), a BTS (Base Transceiver System), and an Access Point.

Figure 1:
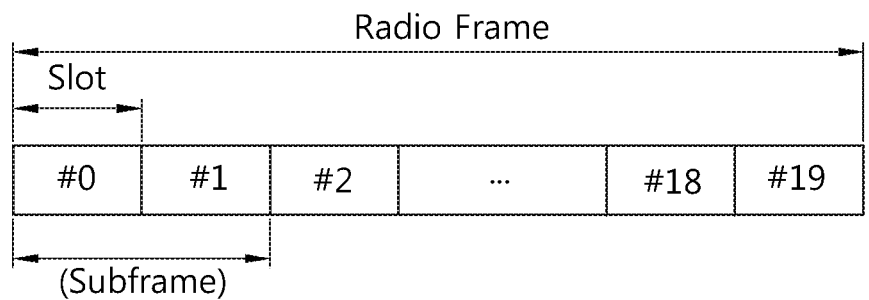
FIG. 1 illustrates a structure of a frequency division duplex (FDD) radio frame in a 3GPP LTE.

FIG. 1 illustrates a structure of a frequency division duplex (FDD) radio frame in a 3GPP LTE. The structure of a frequency division duplex (FDD) radio frame may refer to a fourth section of 3GPP TS 36.211 V8.7.0 (2009 May) "Evolved Universal Terrestrial Radio Access (E-UTRA); Physical Channels and Modulation (Release 8)".

The radio frame includes 10 subframes marked with indexes of 0~9. One subframe includes two continuous slots. A time required to transmit one subframe is a TTI (transmission time interval). For example, a length of one subframe may be 1 ms (milli-second), and a length of one slot may be 0.5 ms.

Figure 2:
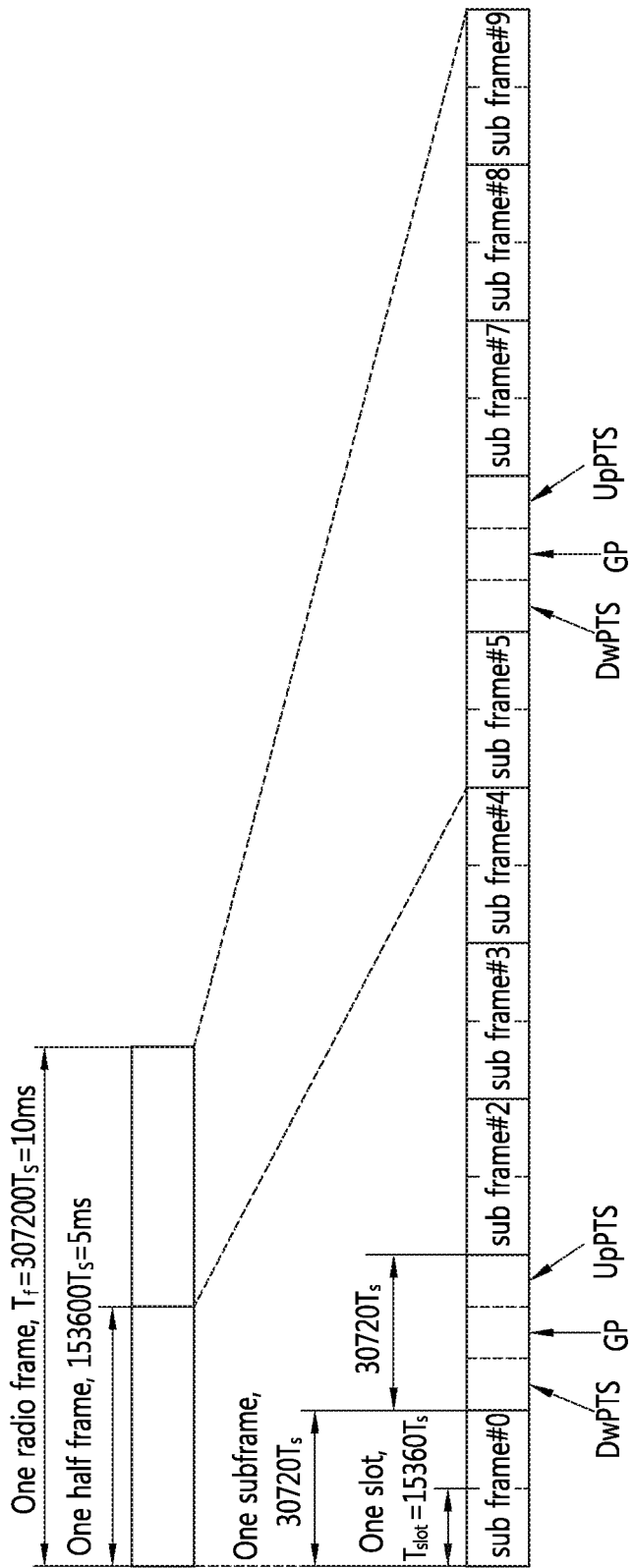
FIG. 2 illustrates a structure of a time division duplex (TDD) radio frame in a 3GPP LTE.

FIG. 2 illustrates a structure of a time division duplex (TDD) radio frame in a 3GPP LTE. A time interval of one radio frame has the relationship of $307200 \cdot T_s = 10$ milli-second (ms).

A downlink (DL) subframe, a Uplink (UL) subframe, and a special subframe (S subframe) may coexist in the TDD radio frame.

Table 1 describes an example of UL-DL configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table 1, the 'D' represents a DL subframe, the 'U' represents an UL subframe, and the 'S' represents a special subframe. If the UL-DL configuration is received from the base station, the UE may know which subframe in the radio frame is a DL subframe or an UL subframe according to the UL-DL configuration.

Meanwhile, when 10 subframes are indexed from 0 to 9 in the radio frame, a subframe having subframe indexes #1 and #6 may include a special subframe. The special subframe includes a Downlink Pilot Time Slot (DwPTS), a Guard Period (GP), and an Uplink Pilot Time Slot (UpPTS). The DwPTS is used for initial cell search, synchronization or channel estimation in the UE. The UpPTS is used for channel estimation in the base station and uplink transmission synchronization of the UE. The GP is an interval to remove interference caused in uplink due to multi-path delay of an uplink signal between uplink and downlink.

The special subframe may determine time intervals such as DwPTS and UpPTS according to special subframe configuration. For example, there may be ten types of special subframe configurations, which will be described.

Figure 3:
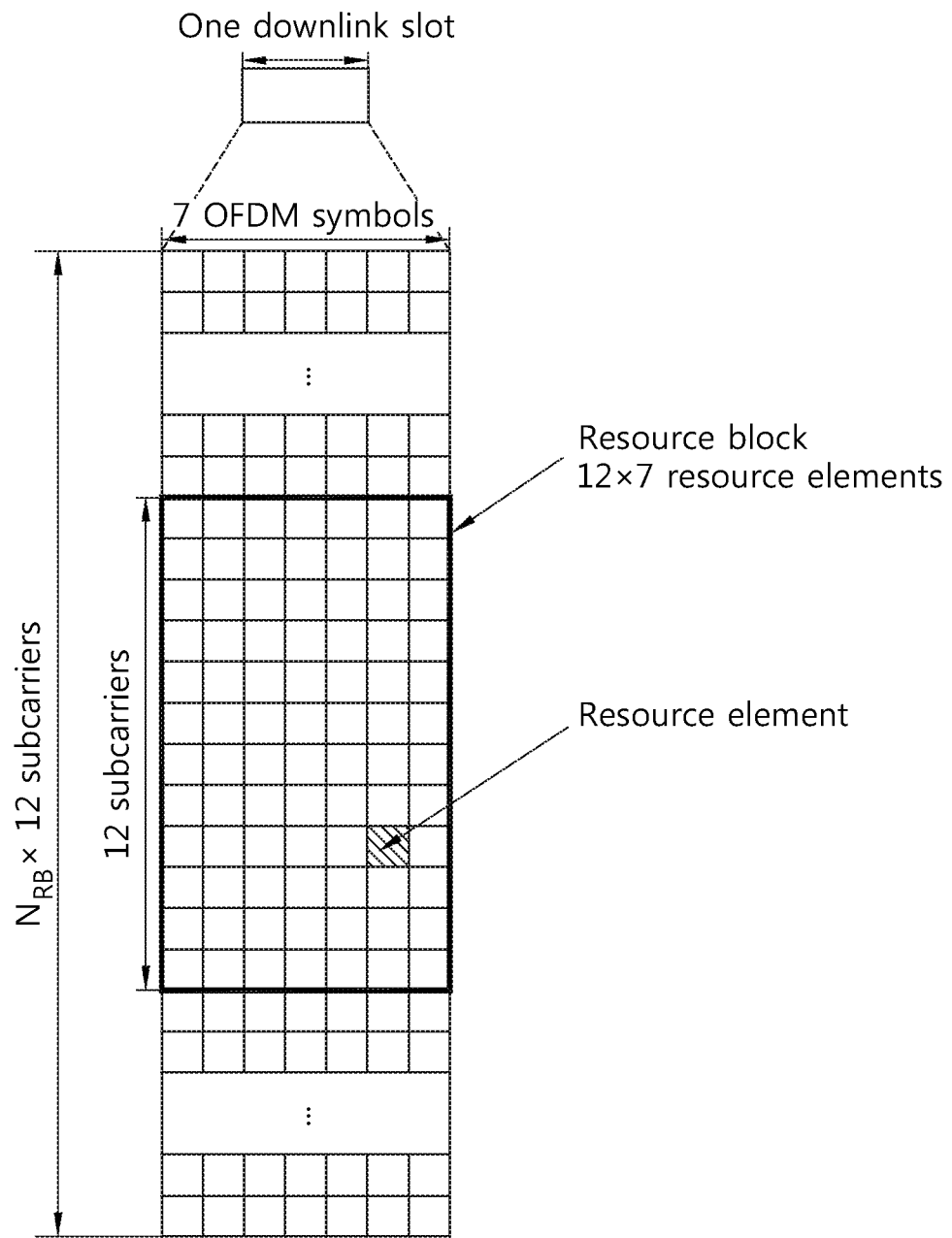
FIG. 3 illustrates an example of a resource grid with respect to one downlink slot.

FIG. 3 illustrates an example of a resource grid with respect to one downlink slot.

Referring to FIG. 3, a downlink slot includes a plurality of OFDM symbols in a time domain and $N_{RB}$ Resource Blocks (RBs) in a frequency domain. The RB includes one slot in the time domain in a resource allocation unit, and a plurality of continuous sub-carriers in a frequency domain. The number $N_{RB}$ of RBs included in the downlink slot depends on a downlink transmission bandwidth set in a cell. For example, the number $N_{RB}$ of RBs in the LTE system may be one of 6 to 110. A structure of the uplink slot may be the same as a structure of the downlink slot.

Meanwhile, each element on the resource grid is a resource element (RE). The resource element on the resource grid may be identified by an index pair (k,l) in a slot. In this case, a k (k=0, . . . , $N_{RB} \times 12 - 1$) represents a sub-carrier index, and l(l=0, . . . , 6) represents an OFDM symbol index in the slot.

Although FIG. 3 has illustrated that one RB is configured by 7 OFDM symbols in a time domain and 12 sub-carriers in a frequency domain to include 7×12 resource elements, and the number of OFDM symbols and the number of sub-carriers in the RB are not limited thereto. A 1 slot in a normal CP may include 7 OFDM symbols, and a 1 slot in an extended CP may include 6 OFDM symbols. The number of the OFDM symbols and the number of the sub-carriers may be variously changed according to a length of the CP, a frequency spacing, and the like. One of 128, 256, 512, 1024, 1536, and 2048 may be selectively used as the number of sub-carriers in one OFDM symbol.

Figure 4:
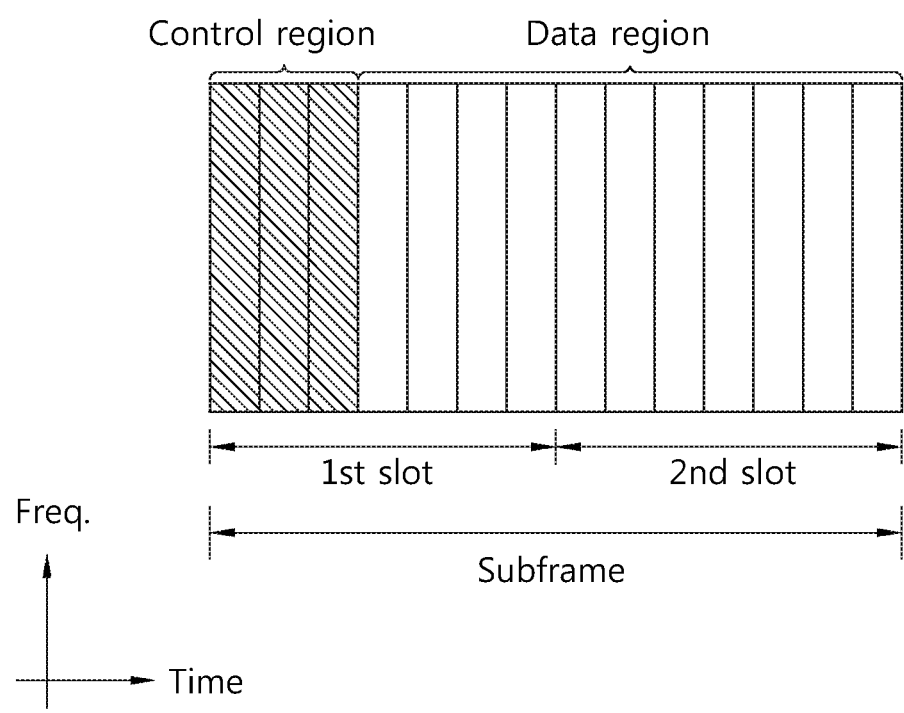
FIG. 4 illustrates a downlink subframe.

FIG. 4 illustrates a downlink subframe.

A downlink (DL) subframe is divided into a control region and a data region in a time region. The control region include maximum 4 OFDM symbols before a first slot in a subframe, but the number of OFDM symbols included in the control region may be changed. A PDCCH (Physical Downlink Control Channel) and other control channel are allocated to the control region, and a PDSCH is allocated to the data region.

As disclosed in 3GPP TS 36.211 V10.2.0, a physical control channel in a 3GPP LTE/LTE-A includes a PDCCH (Physical Downlink Control Channel), a PCFICH (Physical Control Format Indicator Channel), and a PHICH (Physical Hybrid-ARQ Indicator Channel).

A PCFICH transmitted from a first OFDM symbol of the subframe transfers a CFI (control format indicator) regarding the number of OFDM symbols (that is, a size of the control region) used to transmit control channels in the subframe. A wireless device firstly receives a CFI on the PCFICH, and then monitors the PDCCH. Unlike the PDCCH, the PCFICH does not use blind decoding, but is transmitted through a fixed PCFICH resource of the subframe.

The PHICH transfers ACK(acknowledgement)/NACK (not-acknowledgement) signals for uplink (UL) HARQ (hybrid automatic repeat request) process. The ACK/NACK signals regarding UL data on the PUSCH transmitted by the UE are transmitted on the PHICH by the base station.

A PBCH (Physical Broadcast Channel) is transmitted from four OFDM symbols before a second slot of a first subframe of the radio frame. The PBCH transfers essential system information to communicate with the base station, and the system information transmitted through the PBCH refers to MIB (master information block). Meanwhile, system information transmitted on a PDSCH indicated by the PDCCH refers to an SIB (system information block).

Control information transmitted through the PDCCH refers to downlink control information (DCI). The DCI may include resource allocation of the PDSCH (refers to DL grant (downlink grant) or DL assignment (DL assignment)), resource allocation of PUSCH(refers to UL grant), a set of transmission power control commands and/or activation of VoIP(Voice over Internet Protocol) with respect to individual UEs in a predetermined UE group.

Transmission of a DL transmission block in a 3GPP LTE/LTE-A is performed a pair of the PDCCH and the PDSCH. Transmission of a UL transmission block is performed a pair of the PDCCH and the PDSCH. For example, the wireless device receives a DL transmission block on a PDSCH indicated by the PDCCH. The wireless device monitors the PDCCH in a DL subframe, and receives DL resource assignment on the PDCCH. The radio device receives a DL transmission block on a PDSCH indicated by the DL resource assignment.

The base station determines a PDCCH format according to a DCT to be sent to the wireless device to attach a CRC (Cyclic Redundancy Check) to a DCI, and masks unique identifier (refers to RNTI (Radio Network Temporary Identifier) according an owner or an application the PDCCH to CRC.

In a case of a PDCCH for a specific wireless device, an unique identifier of the wireless device, for example, a C-RNTI(Radio Network Temporary Identifier) may be masked to the CRC. Alternatively, in a case of a PDCCH for a paging message, a paging indication identifier, for example, a P-RNTI (Paging-RNTI) may be masked to the CRC. In a case of a PDCCH for system information, system information identifier, that is, SI-RNTI (system information-RNTI) may be masked to the CRC. In order to indicate a random access response being a response to transmission of the random access preamble, RA-RNTI (random access-RNTI) may be masked to the CRC. So as to indicate a TPC (transmit power control) command with respect to a plurality of wireless devices, TPC-RNTI may be masked to the CRC. In a PDCCH for semi-persistent scheduling (SPS), SPS-C-RNTI may be masked to the CRC. The SPS will be describer later.

If C-RNTI series (for example, C-RNTI, SPS-C-RNTI, Temporary C-RNTI) are used, the PDCCH transfer control information (refers to UE-specific control information) for a corresponding specific wireless device. If other RNTI is used, the PDCCH transfers common control information received by all or a plurality of wireless devices in a cell.

A DCI to which the CRC is added is encoded to generate coded data. Encoding includes channel encoding and rat matching. The coded data are modulated to generate modulated symbols. The modulated symbols are mapped to a physical RE (resource element).

The control region in the subframe includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements (REs). According to the relationship between the number of CCEs and a coding rate provided by the CCEs, a format of the PDCCH and the bit number of possible PDCCHs are determined.

One REG includes four REs, and one CCE includes 9 REGs. In order to configure one PDCCH, $\{1, 2, 4, 8\}$ CCE may be used. Each element of $\{1, 2, 4, 8\}$ refers to a CCE aggregation level.

The base station determines the number of CCEs used to transmit the PDDCH is determined according to a channel state. For example, one CCE may be used to transmit the PDCCH in a wireless device having an excellent downlink channel state. 8 CCEs may be used to transmit the PDCCH in a wireless device having a poor downlink channel state.

A control channel configured by one or more CCEs performs interleaving of an REG unit, and is mapped to a physical resource after cyclic shift base a cell ID is performed.

Figure 5:
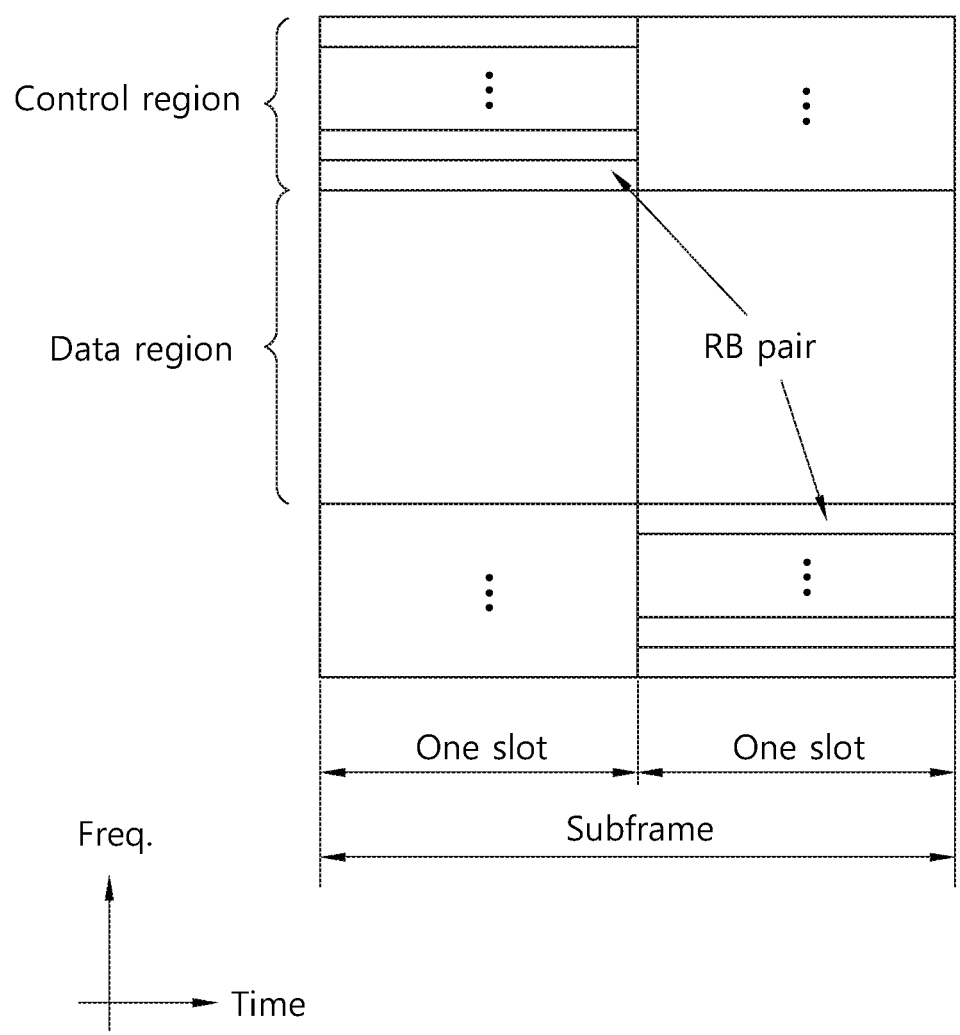
FIG. 5 illustrates an uplink subframe.

FIG. 5 illustrates an uplink subframe.

Referring to FIG. 5, the uplink subframe may be divided into a control region and a data region in a frequency region. A PUCCH (Physical Uplink Control Channel) for transmitting uplink control information is allocated to the control region. A PUSCH (Physical Uplink Shared Channel) for transmitting data (control information may be transmitted together with the data in some cases) is allocated to the data region. The UE may simultaneously transmit the PUCCH and the PUSCH or may transmit only one of the PUCCH and the PUSCH according to setting.

The PUCCH with respect to one UE is allocated as a RB pair in a subframe. RBs belonging to the RB pair have different sub-carriers in a first slot and a second slot, respectively. A frequency of an RB belonging to the RB pair allocated to the PUCCH is changed based on a slot boundary. This means that a frequency of an RB pair allocated to the PUCCH is hopped in a slot boundary. The uplink control information is transmitted through different sub-carriers according to a time so that a frequency diversity gain may be obtained.

HARQ ACK/NACK (hereinafter simply referred to as 'ACK/NACK' or 'HARQ-ACK), channel status information (CSI) representing a downlink channel state, for example, a CQI (Channel Quality Indicator), a PMI (precoding matrix index), a PTI (precoding type indicator), an RI (rank indication), and the like may be transmitted on the PUCCH.

The CQI provides information on a link adaptive parameter supported from the UE with respect to a given time. The CQI may indicate a data rate which may be supported by a downlink channel by taking a characteristic and an SINR (signal to interference plus noise ratio) of a UE receiver into consideration. The base station may modulation (QPSK, 16-QAM, 64-QAM, and the like) and a coding rate to be applied to downlink channel using a CQI. The CQI may be generated in various schemes. For example, the various schemes include a scheme to quantize and feedback a channel state as it is, a scheme to calculate and feedback the SINR (signal to interference plus noise ratio), and a scheme such as an MCS (Modulation Coding Scheme) to report a really applied state to the channel. When the CQI is generated based on the MCS, the MCS includes a modulation scheme, and a coding scheme, and a coding rate according thereto.

The PMI provides information on a precoding matrix in pre-coding of a code-book base. The PMI is associated with an MIMO (multiple input multiple output). Feedback of the PMI in the MIMO refers to a closed loop MIMO.

An RI is information on a rank (that is, the number of layers) recommended by the UE. That is, the RI represents the number of independent streams used for space multi-plexing. Only when the UE is operated in an MIMO mode using the space multiplexing, the RI performs feedback. The RI is always associated with at least one CQI feedback. The feedback CQI is calculated by assuming a specific RI value. In general, since the rank of the channel is changed slower than the CQI, the RI performs feedback less than the feedback number of the CQI. A transmission period of the RI may be a multiple of CQI/PMI transmission period. The RI is given with respect to the whole system band, and a selective frequency RI feedback is not supported.

The PUCCH transfers various types of control information according to a format. The PUCCH format 1 transfers a scheduling request (SR). In this case, an On-Off Keying (OOK) scheme is applicable.

A PUCCH format 1a transfers ACK/NACK modulated in a Binary Phase Shift Keying (BPSK) scheme with respect to one code-word. A PUCCH format 1b transfers the ACK/NACK modulated in a Quadrature Phase Shift Keying (QPSK) scheme with respect to two code-words. A PUCCH format 2 transfers a Channel Quality Indicator (CQI) modulated in the QPSK scheme. PUCCH formats 2a and 2b transfer the CQI and the ACK/NACK, respectively. The PUCCH format may be classified according to a modulation scheme and the number of transmittable bits per subframe. A following table indicates the modulation scheme and the number of bits in the subframe.

TABLE 2

| PUCCH format | Modulation scheme | The number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

All PUCCH formats use cyclic shift (CS) of a shift in each OFDM symbol. The cyclic shifted sequence is generated by cyclically shifting a base sequence by a specific CS amount. A specific CS amount is indicated by a CS index.

An example of defining a base sequence $r_u(n)$ is as follows.

$$r_u(n) = e^{jb(n)\pi/4}$$ [Equation 1]

In the equation 1, the u represents a root index, the n represents an element index and $0 \le n \le N-1$, and the N is a length of the base sequence. The b(n) is defined in a section 5.5 of 3GPP TS 36.211 V8.7.0.

The length of the sequence is the same as the number of elements included in the sequence. The u may be defined by a cell ID (identifier) and a slot number in the radio frame. When the base sequence is mapped to one resource block in a frequency domain, since one resource block include 12 sub-carriers, the length of the base sequence is 12. Other base sequence is defined according to other root index.

A cyclic shifted sequence $r(n, I_{cs})$ may be generated by cyclically shifting the root sequence r(n) as follows.

$$r(n, I_{cs}) = r(n) \cdot \exp\left(\frac{j2\pi I_{cs} n}{N}\right), 0 \le I_{cs} \le N-1$$ [Equation 2]

In equation 2, the $I_{cs}$ represents a cyclic shift index ($0 \le I_{cs} \le N-1$) indicating a CS amount.

An available cyclic shift index of the base sequence means a cyclic shift index which may be derived from the base sequence according to a CS interval. For example, if the length of the base sequence is 12 and the CS interval is 1, the total number of available cyclic shift indexes of the base sequence is 12. Further, if the length of the base sequence is 12 and the CS interval is 2, the total number of available cyclic shift indexes of the base sequence is 6.

Figure 6:
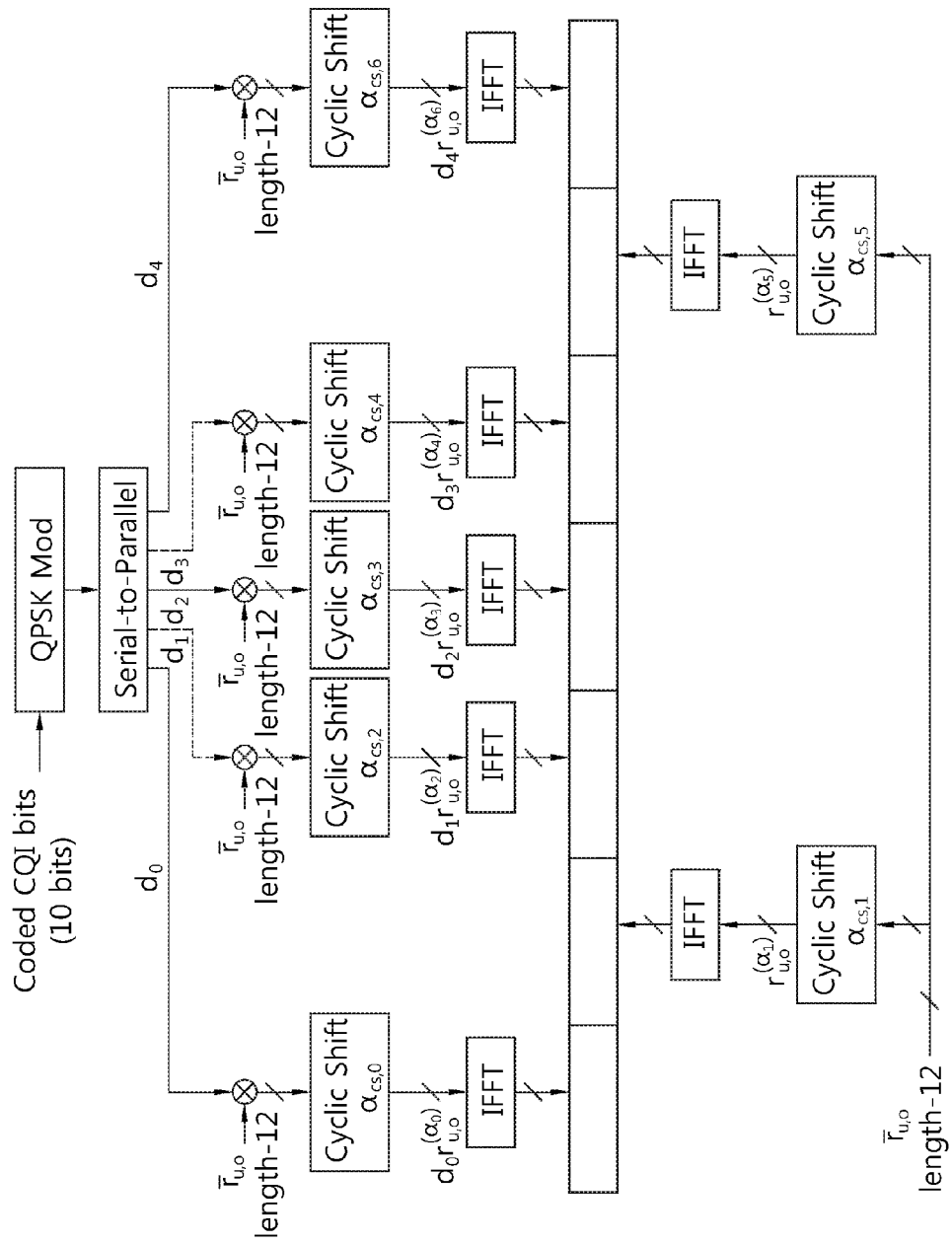
FIG. 6 illustrates a channel structure of a PUCCH format 2/2a/2b with respect to one slot in a normal CP.

FIG. 6 illustrates a channel structure of a PUCCH format 2/2a/2b with respect to one slot in a normal CP. As described above, the PUCCH format 2/2a/2b is used to transmit a CQI.

Referring to FIG. 6, SC-FDMA symbols 1 and 5 are used for a DM RS (demodulation reference symbol) which is a uplink reference signal. In a case of the CP, an SC-FDMA (single carrier-frequency division multiple access) symbol 3 is used for a DM RS.

10 CQI information bits are channel-coded with, for example, a 1/2 rate to be 20 coded bits. A Reed-Muller (RM) may be used for the channel coding. Further, after scrambling (PUSCH data is scrambled to a gold sequence having a length 31), a QPSK constellation mapping is performed so that a QPSK modulation symbol is generated ($d_0$ to $d_4$ in a slot 0). After each QPSK modulation symbol is modulated to a cyclic shift of a base RS sequence having a length 12 and is OFDM-modulated, 10 SC-FDMA symbols in a sub-frame are transmitted. 12 uniformly spaced cyclic shifts may be multiplexed so that different UEs are orthogonal to each other in the same PUCCH resource block. A DM RS sequence applied to the SC-FDMA symbols 1 and 5 may use a base RS sequence having a length 12.

Figure 7:
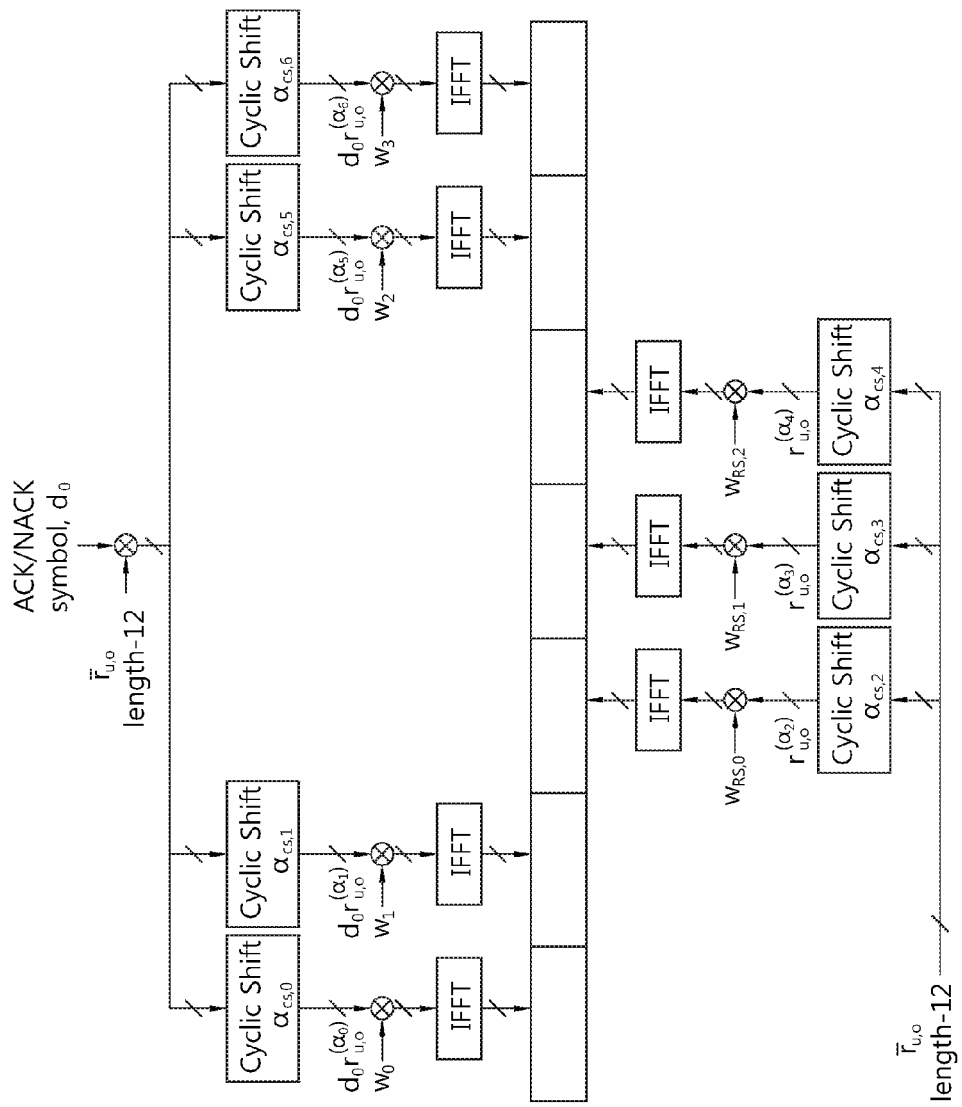
FIG. 7 illustrates a PUCCH format 1a/1b with respect to one slot in a normal CP.

FIG. 7 illustrates a PUCCH format 1a/1b with respect to one slot in a normal CP. A uplink reference signal is transmitted in third to fifth SC-FDMA symbols. In FIG. 7, after IFFT (Inverse Fast Fourier Transform) for $w_0$, $w_1$, $w_2$, and $w_3$ is performed, the $w_0$, $w_1$, $w_2$, and $w_3$ may be modulated in a time domain and may be modulated in a frequency domain before IFFT modulation.

One symbol includes seven OFDM symbols, 3 OFDM symbols become an RS (Reference Signal) OFDM symbol for a reference signal, and 4 OFDM symbols become a data OFDM symbol for ACK/NACK signals.

In a PUCCH format 1b, encoded 2 bit ACK/NACK signals are QPSK (Quadrature Phase Shift Keying)-modulated so that a modulation symbol d(0) is generated.

A cyclic shift index $I_{cs}$ may be changed according to a slot number $n_s$ in a radio frame and/or a symbol index 1 in a slot.

Since there are 4 data OFDM symbols to transmit ACK/NACK signals to one slot in a normal CP, it is assumed that cyclic shift indexes corresponding to each data OFDM symbol are $I_{cs0}$, $I_{cs1}$, $I_{cs2}$, and $I_{cs3}$.

A modulation symbol d(0) is extended to a cyclic shifted sequence $r(n, I_{cs})$. If one dimensional spread sequence corresponding to an (i+1)-th OFDM symbol in the slot is m(i), $$\{m(0), m(1), m(2), m(3)\} = \{d(0)r(n, I_{cs0}), d(0)r(n, I_{cs1}), d(0)r(n, I_{cs2}), d(0)r(n, I_{cs3})\}.$$

In order to increase a capacity of the UE, the one dimensional spread sequence may be spread using an orthogonal sequence. An orthogonal sequence $w_i(k)$ (I represents a sequence index, $0 \leq k \leq K-1$) having spreading factor K=4 uses a following sequence.

TABLE 3

| Index (i) | $[w_i(0), w_i(1), w_i(2), w_i(3)]$ |
|---|---|
| 0 | [+1, +1, +1, +1] |
| 1 | [+1, −1, +1, −1] |
| 2 | [+1, −1, −1, +1] |

An orthogonal sequence $w_i(k)$ (i represents a sequence index, $0 \leq k \leq K-1$) having spreading factor K=3 uses a following sequence.

TABLE 4

| Index (i) | $[w_i(0), w_i(1), w_i(2)]$ |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

Different spreading coefficients may be used according to the slot.

Accordingly, when an optional orthogonal sequence index i is given, two dimensional spread sequences {s(0), s(1), s(2), s(3)} may be expressed as follows.

$$\{s(0),s(1),s(2),s(3)\}=\{w_i(0)m(0),w_i(1)m(1),w_i(2)m(2),w_i(3)m(3)\}$$

After an IFFT for the two dimensional sequences {s(0), s(1), s(2), s(3)} is performed, the sequences are transmitted in a corresponding OFDM symbol. Accordingly, the ACK/NACK signals are transmitted on a PUCCH.

A reference signal of a PUCCH format 1b is spread and transmitted as an orthogonal sequence after cyclically shifting the base sequence r(n). If cyclic shift indexes corresponding to three RS OFDM symbols are $I_{cs4}$, $I_{cs5}$, and $I_{cs6}$, three cyclic shifted sequences $r(n,I_{cs4})$, $r(n,I_{cs5})$, $r(n,I_{cs6})$ may be obtained. The three cyclic shifted sequence are spread to an orthogonal sequence $w_{RS,i}(k)$ of K=3.

The orthogonal sequence index i, the cyclic shift index $I_{cs}$ and the resource block index m may include a parameter necessary to configure the PUCCH and a resource used to identify the PUCCH (or UE). If the number of available cyclic shifts is 12 and the number of available orthogonal sequence indexes is 3, a PUCCH with respect to 36 UEs may be multiplexed to one resource block.

In the 3GPP LTE, $n^{(1)}_{PUCCH}$ is defined when the UE acquires three parameters to configure the PUCCH. A resource index is defined as $n^{(1)}_{PUCCH}=n_{CCE}+N^{(1)}_{PUCCH}$. The $n_{CCE}$ represents an index of a first CCE (CCE having the lowest index) used to transmit a corresponding DCI (that is, downlink resource allocation to receive downlink data being a target of the ACK/NACK signals), and $N^{(1)}_{PUCCH}$ represents where the base station reports to the UE as a higher layer message.

Hereinafter, a time, a frequency, and a code resource used to transmit the ACK/NACK signals refer to ACK/NACK resources or PUCCH resources. As described above, an index to determine the PUCCH resource (refer to PUCCH index), that is, an index necessary to transmit ACK/NACK signals on a PUCCH may be expressed by at least one of {orthogonal sequence index i, cyclic shift index $I_{cs}$, resource block index m} or an index ($n^{(1)}_{PUCCH}$) to obtain the three indexes. That is, the PUCCH resource may include at least one of an orthogonal sequence, a cyclic shift, a resource block, and a combination thereof. The index indicating the PUCCH resource may refer to a PUCCH index.

Meanwhile, in an LTE-A, a PUCCH format 3 is introduced to transmit uplink control information (for example, ACK/NACK and SR) of maximum 21 bits (the number of bits before channel coding as information bit, maximum 22 bits when an SR is included). The PUCCH format 3 uses a QPSK in a modulation scheme, and the number of transmittable bits in a subframe is 48 bits).

The PUCCH format 3 performs block spreading based transmission. A modulation symbol sequence obtained by modulating a multi-bit ACK/NACK using a block spreading code.

Figure 8:
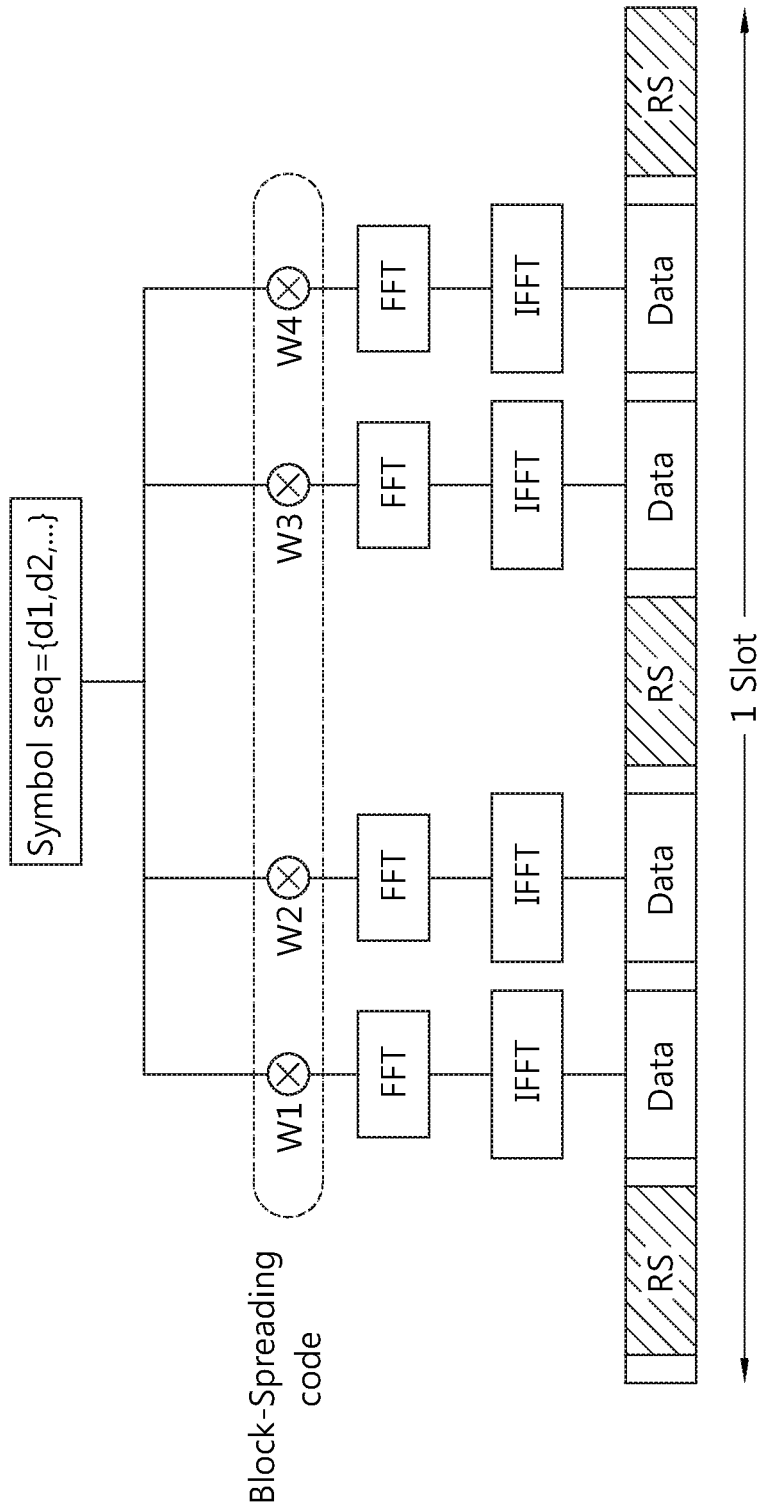
FIG. 8 illustrates a channel structure of a PUCCH format 3.

FIG. 8 illustrates a channel structure of a PUCCH format 3.

Referring to FIG. 8, a block spreading code is applied to a modulation symbol sequence {d1, d2, . . . } and is spread in a time domain. The block spreading code may include an orthogonal cover code (OCC). In this case, in the modulation symbol sequence, ACK/NACK information bits are channel-coded (using RM code, TBCC, punctured RM code) so that ACK/NACK coded bits are generated, the ACK/NACK coded bits are a sequence of modulated (for example, QPSK) symbols. The sequence of the modulation symbols is mapped to data symbols of a slot through FFT (fast Fourier transform) and IFFT (inverse fast Fourier transform) to be transmitted. Although FIG. 8 illustrates that three RS symbols are included in one slot, two RS symbol may exist. In this case, a block spreading code of a length 5 may be used.

<Semi-Persistent Scheduling: SPS>

In the wireless communication system, the UE receives scheduling information such as DL grant and UL grant through a PDCCH to perform an operation of transmitting the PUSCH. In general, the DL grant and the PDSCH are received in the same subframe. Further, in a case of the FDD, the PUSCH is transmitted after fourth subframes from a subframe receiving the UL grant. An LTE except for the dynamic scheduling provides semi-persistent scheduling (SPS).

Downlink or uplink SPS may report by which subframe semi-static transmission (PUSCH)/reception (PDSCH) is performed to the UE through a higher layer signal. For example, a parameter give as the higher layer signal may be a period and an offset value of the subframe.

The UE recognizes SPS transmission/reception through RRC signaling. If receiving activation and release signal of SPS transmission through the PDCCH, the UE performs or releases SPS transmission/reception. That is, although an SPS is allocated through RRC signaling, when SPS transmission/reception are not performed but the activation or release signal is received through the PDCCH, frequency resource (resource block) according to a resource block allocation designated in the PDCCH and modulation and a coding rate according to MCS information are applied so that SPS transmission/reception are performed in a subframe corresponding to a subframe period and an offset value allocated through RRC signaling. If an SPS release signal is received through the PDSSH, SPS transmission/reception stop. If a PDCCH (SPS reactivation PDCCH) including an SPS activation signal is again received, the stopped SPS transmission/reception restarts using a frequency resource and an MCS designated by a corresponding PDCCH.

Hereinafter, a PDCCH for SPS activation refers to an SPS activation PDCCH, and a PDCCH for SPS release refers to an SPS release PDCCH. The UE may validate whether the PDCCH is SPS activation/release PDCCH when following conditions are satisfied. 1. CRC parity bits obtained from a PDCCH payload are scrambled to SPS C-RNTI, and 2. A value of new data indicator field should be '0'. Further, if each filed value included in the PDCCH is set as values of a following table, the UE recognizes that downlink control information (DCI) of a corresponding PDCCH is SPS activation or release.

TABLE 5

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The table 5 indicates a filed value of an SPS activation PDCCH to validate SPS activation.

TABLE 6

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

The table 6 indicates a field value of an SPS release PDCCH to validate the SPS release.

By the SPS, a PDCCH indicating an SPS activation and a PDSCH transmitted from the same subframe has a corresponding PDCCH (that is, PDCCH indicating SPS activation), a next PDSCH, that is, by the SPS, a next scheduled PDSCH (refer to SPS PDSCH) does not have a corresponding PDCCH. Accordingly, when transmitting ACK/NACK with respect to the SPS PDSCH, it is impossible to use a PUCCH resource mapped to the lowest CCE index of the PDCCH.

Accordingly, the base station previously sets a plurality of resources through a higher layer signal like an RRC message, and then uses a TPC field included in a PDCCH indicating SPS activation as an ARI (ACK/NACK resource indicator) to indicate ACK/NACK transmission resources with respect to SPS PDSCH in a scheme of indicating a specific resource among a plurality of resources. Such ACK/NACK transmission resources may refer to an explicit resource.

<HARQ (Hybrid Automatic Repeat Request)>

Upon transmission/reception of data between the base station and the UE, when the frame is not received or damaged, an error control method includes an ARQ (Automatic Repeat request) scheme and a HARQ (hybrid ARQ) scheme which is a developed scheme thereof. In the ARG scheme, after one frame is transmitted, a confirmation message ACK is waited for. Only when a reception side exactly receives the frame, the reception side sends the confirmation message ACK. When an error occurs in the frame, the reception side sends a NACK (negative-ACK) message, and a reception frame with the error removes the information in a receiving end buffer. When the transmission side receives the ACK signal, the transmission side transmits a next frame. When receive the NACK message, the transmission side retransmits the frame.

Unlike the ARG scheme, according to the HARQ scheme, when the received frame cannot be demodulated, a receiving end transmits an NACK message to the transmitting end. However, when the received frame is stored in the buffer for a predetermined time so that the frame is retransmitted, the frame is coupled with the received frame so that a reception success rate is increased.

In recent years, more efficient HARQ scheme than the ARQ scheme may be widely used. There are various types of HARQ schemes. The HARQ scheme may be divided into synchronous HARQ and asynchronous HARQ according to retransmission timing. The HARQ scheme may be divided into a channel-adaptive scheme and a channel-non-adaptive scheme according to presence of reflection of a channel state with respect to an amount of a resource used upon retransmission.

Figure 9:
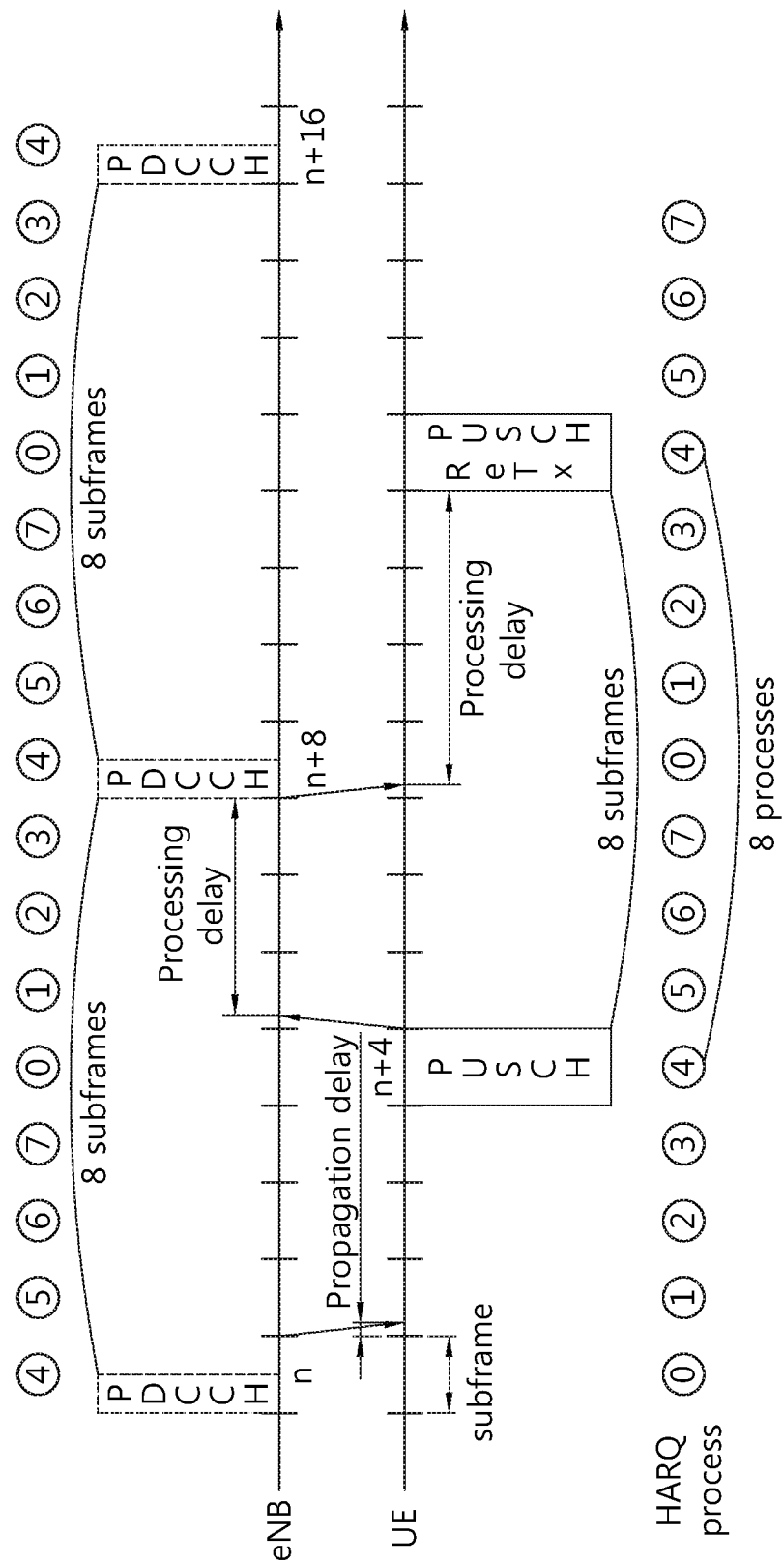
FIG. 9 illustrates a synchronization HARQ.

FIG. 9 illustrates a synchronization HARQ.

The synchronization HARQ is a scheme where next retransmission is achieved at preset timing by a system. That is, if it is assumed that the time of the retransmission is achieved an 8-th time unit after initial transmission, since the engagement is achieved between the base station and the UE, it is not necessary to additionally report the timing. However, if the data transmission side receives an NACK message, data are transmitted in every 8-th time unit in order to receive the ACK message.

Meanwhile, retransmission timing of the asynchronization HARQ scheme is newly scheduled or the asynchronization HARQ scheme may be achieved through additional signaling. Retransmission timing with respect to data in which transmission previously fails is changed due to various factors such as a channel state.

A channel non-adaptive HARQ scheme is a scheme where modulation of data, the number of resource blocks, and a coding scheme upon retransmission are achieved in an order determined in initial transmission. Meanwhile, in the channel adaptive HARQ scheme is a scheme where the modulation of data, the number of resource blocks, and a coding scheme are changed according to a state of the channel.

For example, the transmission side transmits data using 6 resource blocks upon initial transmission. Next, a scheme of equally retransmitting the data using 6 resource blocks is a channel non-adaptive HARQ scheme.

Meanwhile, a scheme of retransmitting data using resource blocks greater or less than 6 according to a channel state although the data are initially transmitted using 6 resource blocks is a channel adaptive HARQ scheme.

Four types of HARQs may be combined through the above classification. A widely used HARQ scheme includes asynchronization and channel adaptive HARQ scheme and synchronization and channel non-adaptive HARQ scheme. Since the asynchronization and channel adaptive HARQ scheme may maximize retransmission efficiency by adaptively changing retransmission timing and an amount of a resource but overhead is increased, the asynchronization and channel adaptive HARQ scheme is not generally considered for uplink. Meanwhile, since the synchronization and channel adaptive HARQ does not substantially have overhead because timing and resource allocation for retransmission are engaged in the system, overhead is rare, but retransmission efficiency is very lower in a channel state having great variation.

In downlink in a current 3GPP LTE, the asynchronization HARQ scheme is used. In uplink case, the synchronization HARQ scheme is used.

Meanwhile, in the downlink, until ACK/NACK signals are received from the UE and data are transmitted after scheduling is performed and the data are transmitted, as shown in FIG. 9, time delay occurs. This is a delay due to a time required for transfer delay of a channel, data decoding and data encoding. In order to transmit blank free data during the delay interval, a transmitting scheme using an independent HARQ process is used.

For example, if the shortest period between next data transmission and next data transmission is 8 subframe, 8 independent processes are performed so that data may be transmitted without blank. When the MIMO is not performed in the LTE FDD, maximum 8 HARQ processes may be allocated.

<Carrier Aggregation>

Hereinafter, the carrier aggregation system will be described.

Figure 10:
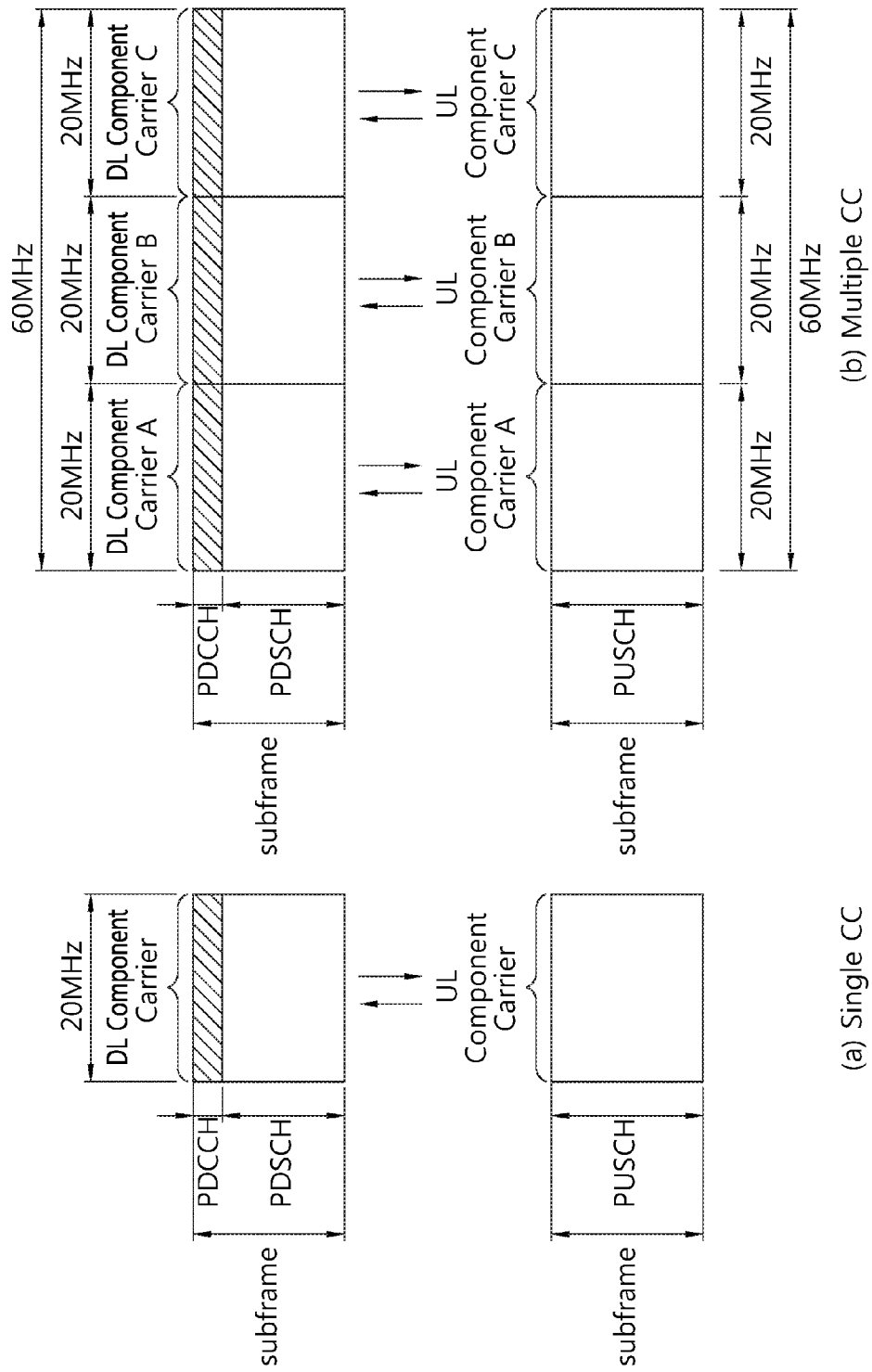
FIG. 10 illustrates an example of comparing an existing single carrier system and a carrier aggregation system.

FIG. 10 illustrates an example of comparing an existing single carrier system and a carrier aggregation system.

Referring to FIG. 10, in a single carrier system, only one carrier is supported to the UE in uplink and downlink. Although there may be various bandwidths of the carrier, one carrier is allocated to the UE. Meanwhile, in the CA system, a plurality of component carriers (DL CC A to C, UL CC A to C). The component carrier (CC) means a carrier used for the CA system and may refer to a carrier. For example, in order to allocate a bandwidth of 60 MHz to the UE, 3 component carriers of 20 MHz may be allocated.

The CA system may be classified into a continuous CA system where aggregated carriers continue and a non-continuous CA system where the aggregated carriers are spaced apart from each other. Hereinafter, it is understood that the CA system includes all of a case of a continuous component carrier and a case of a non-continuous component carrier.

A system frequency band of the wireless communication system is classified into a plurality of carrier-frequencies. The carrier frequency means a center frequency of a cell. Hereinafter, the cell may mean a downlink frequency resource and an uplink frequency resource. Alternatively, the cell may mean a combination of the downlink frequency resource and an optional uplink frequency resource. Further, generally, when the CA is not considered, one cell may include a pair of uplink and downlink frequency resources.

In order to transmit/receive packet data through the specific cell, the UE should finish configuration with specific cell. In this case, the configuration means a state of finishing reception of system information necessary to transmit/receive data with respect to a corresponding cell. For example, the configuration may include the whole procedure to receive common physical layer parameters necessary to transmit/receive data, or MAC (media access control) layer parameters, or parameters necessary for a specific operation at an RRC layer. If a cell in which the configuration is terminated receives only information indicating that packet data may be transmitted, the cell may transmit and receive a packet at once.

The cell in which the configuration is terminated may be in an activation state or a deactivation state. In this case, the activation means that data are transmitted or received or transmission or reception of the data in a ready state. The UE may monitor or receive a control channel PDCCH and a data channel PDSCH of an activated cell in order to confirm resources (frequency, time, or the like) allocated to the UE.

The deactivation means that transmission or reception of traffic data is impossible and measurement or transmission/reception of minimum information is possible. The UE may receive system information SI necessary to receive a packet from a deactivated cell. Meanwhile, the UE does not monitor or receive a control channel PDCCH and a data channel PDSCH of the deactivated cell in order to confirm resources (frequency, time, or the like).

The cell may be classified into a primary cell, a secondary cell, and a serving cell.

The primary cell means a cell operating at a primary frequency, and means a cell performing initial connection establishment procedure or connection reestablishment procedure with the base station or a cell indicated as a primary cell at a handover procedure.

The secondary cell means a cell operating in a secondary cell. If RRC connection is established, the secondary cell is used to provide an additional preset wireless resource.

In a case of UE in which the CA is not set or does not provide the CA, the serving cell is configured by the primary cell. When the carrier aggregation is set, the term 'serving cell' represents a cell set to the UE and a plurality of serving cell may be configured. One serving cell may be configured by one downlink component carrier or a pair of {downlink component carrier, uplink component carrier}. A plurality of serving cells may be configured by a primary cell and one secondary cell or a plurality of secondary cells.

A PCC (primary component carrier) signifies a component carrier (CC) corresponding to a primary cell. The PCC is a CC where the UE initially achieves connection or RRC connection with the base station among a plurality of CCs. The PCC is a special CC to provide connection or RRC connection for signaling regarding a plurality of CC, and to manage UE context which is connection information associated with the UE. Further, when the PCC accesses the UE in an RRC connection mode, the PCC is always in an active state. A downlink component carrier corresponding to the primary cell refers to a DownLink Primary Component Carrier (DL PCC) and an uplink component carrier corresponding to the primary cell refers to an uplink primary component carrier (UL PCC).

The SCC (secondary component carrier) means a CC corresponding to the secondary cell. That is, the SCC is a CC allocated to the UE except for a PCC. The SCC is an extended carrier when the UE selects for additional resource allocation except for the PCC, and may be divided into a activation state or a deactivation state. A downlink component carrier corresponding to the secondary cell refers to a DownLink secondary Component Carrier (DL SCC) and an uplink component carrier corresponding to the second cell refers to an uplink secondary component carrier (UL SCC).

The primary cell and the secondary cell have following characteristics.

First, the primary cell is used to transmit the PUCCH. Second, the primary cell is always activated, but the second cell is a carrier which is activated/deactivated according to a specific condition. Third, when the primary cell experiences a Radio Link Failure (hereinafter referred to as 'RLF'). Fourth, the primary cell may be changed according to variation in a security key, a RACH (Random Access CHannel) procedure, and an accompanying handover procedure. Fifth, NAS (non-access stratum) information is received through the primary cell. Sixth, in a case of an FDD system, the primary cell always configures a pair of the DL PCC and the UL PCC. Seventh, different component carriers CCs may be set as the primary cell every UE. Eighth, the primary cell may be replaced by only handover, cell selection/cell reselection procedures. In addition of a new secondary cell, RRC signal may be used to transmit system information of a dedicated secondary cell.

In a component carrier configuring the serving cell, the downlink component carrier may configure one serving cell, or the downlink component carrier and the uplink component carrier are connected and configured so that one serving cell may be configured. However, the serving cell may not be configured by only one uplink component carrier.

Activation/deactivation of the component carrier is similar to concept of activation/deactivation of the serving cell. For example, activation of the serving cell 1 means activation of the DL CC1 on the assumption that the serving cell 1 is configured by a DL CC1. If the activation of the serving cell 2 means activation of a DL CC2 and the UL CC2 on the assumption that the serving cell 2 is configured by connecting and configuring a DL CC2 and a UL CC2. In this meaning, each component carrier may correspond to a serving cell.

The number of component carriers aggregated between downlink and uplink may be differently set. When the number of CCs in the downlink is the same as the number of CCs in the uplink, the aggregation is symmetric. When the number of CCs in the downlink is different from the number of CCs in the uplink, the aggregation is asymmetric. Further, the sizes (that is, bandwidths) of the CCs may be different from each other. For example, when five CCs is used to configure 70 MHz band, 5 MHz CC(carrier #0)+20 MHz CC(carrier #1)+20 MHz CC(carrier #2)+20 MHz CC(carrier #3)+5 MHz CC(carrier #4) may be configured.

As described above, the CA system may support a plurality of CCs, that is, a plurality of serving cells unlike the single carrier system.

Such a CA system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carrier except for a component carrier fundamentally linked with the specific component carrier. That is, the PDCCH and the PDSCH may be transmitted through different DL CCs, a PUSCH may be transmitted through a UL CC different from a UL CC liked with a DL CC to which a PDCCH including an UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

A CA system to support the cross-carrier scheduling may include a carrier indicator field (CIF) included in a DCI (downlink control information) format according to the related art. In the system to support the cross-carrier scheduling, for example, an LTE-A system, since a CIF is added to an existing DCI format (that is, a DCI format used in an LTE), 3 bits may be spread, and a PDCCH structure may reuse an existing coding method, a resource allocation method (that is, a CCE based resource mapping).

The base station may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the base station transmits a PDCCH with respect to PDSCH/PUSCH to be scheduled through only the DL CCs included in the PDCCH monitoring DL CC group. The PDCCH monitoring DL CC group may be configured to UE-specific, UE group-specific, or cell-specific.

<Method of Transmitting ACK/NACK in an HARQ Process>

Hereinafter, the following is ACK/NACK transmission for HARQ in a 3GPP LTE.

In the FDD, when two serving cells are configured, UE to support aggregation of maximum two serving cells transmits ACK/NACK using PUCCH format 1b using channel selection.

When at least two serving cells are configured, UE to support aggregation of at least three serving cells transmits ACK/NACK using a PUCCH format 1b or a PUCCH format 3 using channel selection according to setting a higher layer signal. The PUCCH format 1b using the channel selection will be described below.

Unlike the FDD (Frequency Division Duplex), DL subframes and UL subframes coexist in a TDD. Generally, the number of the UL subframes is less than the number of DL subframes. Accordingly, in order to compensate a case where UL sub-carriers are insufficient to transmit ACK/NACK signal, a plurality of ACK/NACK signals with respect to a plurality of DL transmission blocks (or a plurality of PDSCHs) are transmitted from one UL subframe.

Two types of ACK/NACK modes with bundling and channel selection are supported in UE not to support aggregation of at least two serving cells according to the higher layer configuration.

First, the bundle transmits ACK when the UE succeeds all decoding of a received PDSCH (that is, downlink transmission blocks) and transmits NACK in remaining cases. This refers to an AND operation. However, the bundle is not limited to the AND operation but may include various operations to compress ACK/NACK bits corresponding to a plurality of transmission blocks (or code-words). For example, the bundle may indicate a value counting the number of ACKs (or NACKs) or the number of continuous ACKs.

Second, the channel selection refers to ACK/NACK multiplexing. In the channel selection, the UE selects one from a plurality of PUCCH resources to transmit ACK/NACK to the selected PUCCH resource.

A following table is an example of a DL subframe n−k associated with an UL subframe n according to UL-DL configuration in the 3GPP LTE. In this case, k∈K, and the M represents the number of components of a group K.

TABLE 7

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8 7, 5, 4, 11 6 | — | — | — | — | — | — | — |
| 6 | — | — | 7 | 7 | 5 | — | — | 7 | 7 | — |

M=3 is considered on the assumption that M DL subframes are connected to a UL subframe n. Three PDCCHs may be received from three DL subframes, and the UE may acquire 3 PUCCH resources ($n^{(1)}_{PUCCH,0}$, $n^{(1)}_{PUCCH,1}$, $n^{(1)}_{PUCCH,2}$). An example of the channel selection in the TDD is as follows.

TABLE 8

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the table 8, HARQ-ACK(i) represents ACK/NACK with respect to an i-th downlink subframe among M downlink subframes. DTX (DTX (Discontinuous Transmission) means that a DL transmission block is not received on a PDSCH in a corresponding DL subframe or a corresponding PDCCH is not detected. According to the above table 8, there are 3 PUCCH resources ($n^{(1)}_{PUCCH,0}$, $n^{(1)}_{PUCCH,1}$, $n^{(1)}_{PUCCH,2}$), and b(0) and b(1) are two bits transmitted using a selected PUCCH.

For example, if the UE successively receives all of the three DL transmission blocks in three DL subframes, the UE QPSK-modulate a bit (1,1) using $n^{(1)}_{PUCCH,2}$ to transmit the modulated bit. If the UE fails decoding of a DL transmission block in a first (i=0) DL subframe and succeeds decoding of DL transmission blocks in remaining subframes, the UE transmits a bit (1,0) on the PUCCH using $n^{(1)}_{PUCCH,2}$.

In the channel selection, if there is at least one ACK, NACK is coupled with DTX. This is because all ACK/NACK states may be expressed by a combination of a reserved PUCCH resource and a QPSK symbol. However, there is no ACK, the DTX is coupled from the NACK.

An existing PUCCH format 1b may transmit only ACK/NACK having 2 bits. However, the PUCCH format 1b using the channel selection represents more ACK/NACK states by linking a combination of allocated PUCCH resources and a modulation symbol (2 bits) to a state of a plurality of ACK/NACK.

In the TDD, when UL-DL configuration 5 is selected and the UE does not support aggregation of at least two serving cells, only bundling is supported.

In a case of the UE supporting aggregation of at least two serving cells, at least two serving cells are configured, the UE transmits ACK/NACK using one of a PUCCH format 1b (PUCCH format 1b with channel selection) or a PUCCH format 3 according to setting of a higher layer.

When the UE to support at least two serving cells is set according to a higher layer signal to use bundle and one serving cell is set in the TDD, the UE may transmit ACK/NACK using one of a PUCCH format 1b (PUCCH format 1b with channel selection) or a PUCCH format 3 according to setting the higher layer.

In the FDD, a table similar to the table 8 is defined and accordingly ACK/NACK may be transmitted.

The present invention will now be described.

MTC (machine type communication), MU-MIMO (multi-user multi-input multi-output), and CA between TDD cells using different UL-DL configurations may be used in a next generation wireless communication system. Further, the number of simultaneously scheduled UEs may be increased.

Accordingly, a control channel to schedule an existing data channel may be insufficient. In order to solve a resource insufficient phenomenon of a PDCCH being a control channel in a 3GPP LTE, bundled scheduling to schedule a plurality of PDSCHs transmitted through a plurality of subframes or a plurality of cells through one PDCCH is considered or cross-subframe scheduling is considered to flexibly use the PDCCH. The cross-subframe scheduling is to transmit the PDSCH by a PDCCH scheduling the PDSCH from a subframe different from a subframe transmitted from the PDSCH.

Meanwhile, introduction of an E-PDCCH (enhanced-PDCCH) except for an existing PDCCH is considered.

<E-PDCCH>

Figure 11:
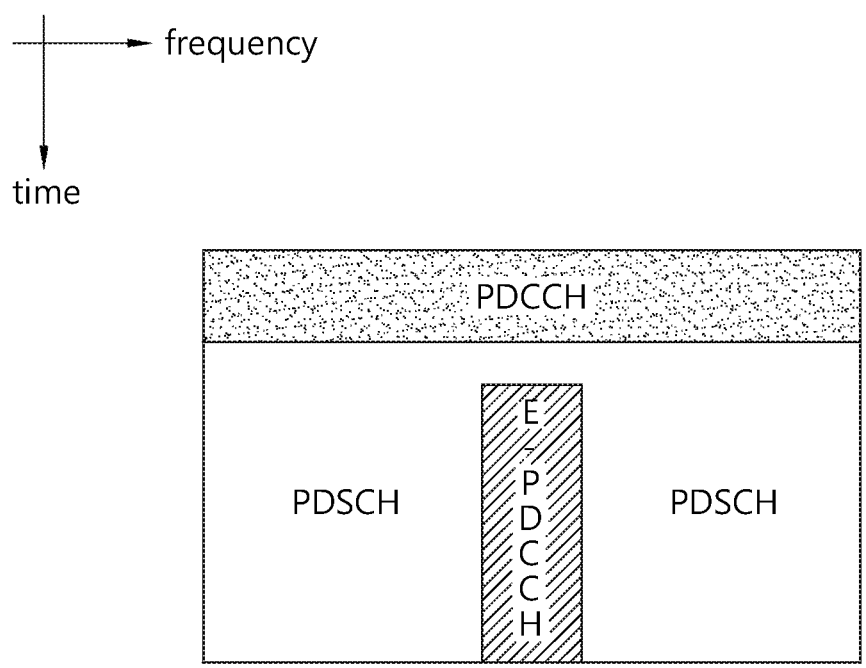
FIG. 11 illustrates an example of E-PDCCH allocation.

FIG. 11 illustrates an example of E-PDCCH allocation.

It is considered in an LTE-A that an E-PDCCH is allocated into a data region to be used. The E-PDCCH may be a control channel configured in a data region to which the PDSCH is transmitted and may be a control channel to perform demodulation using a UE specific reference signal. That is, the E-PDCCH is clearly distinguished from a PDCCH being an existing control channel in a reference signal used for an allocated region and demodulation.

Meanwhile, the E-PDCCH configures an E-CCE (enhanced-CCE) similar to the PDCCH and may apply implicit PUCCH resource mapping based on the configured E-CCE. The E-CCE is a configuration unit to configure the E-PDCCH. A resource amount included in the E-CCE may be the same as or different from a resource amount included in a CCE configuring the PDCCH.

Further, when an ARI is included in the E-PDCCH, offset using the ARI may be used to select an explicit PUCCH resource.

When transmit diversity is used to transmit ACK/NACK with respect to a PDSCH scheduled through the E-PDCCH, there is a need for a method to configure the PUCCH resource.

In a case of the LTE, ACK/NACK with respect to the PDSCH are transmitted through PUCCH formats 1a/1b. The UE receiving the data transmits ACK/NACK in a subframe after the minimum number $k_{min}$ of subframes by taking propagation delay and a processing time required for processing control information/data into consideration. For example, $k_{min}$=4 in the FDD.

Since the UL subframe and the DL subframe always satisfy the relationship of 1:1 in the FDD, ACK/NACK are transmitted in a subframe after 4 subframes from a PDSCH reception subframe.

A ratio of the UL subframe to the DL subframe is not always 1:1 in the TDD. Accordingly, ACK/NACK are transmitted from a possible rapid UL subframe among UL subframes satisfying the $k_{min}$. In this case, too many ACK/NACK may be prevented from being transmitted from a specific UL subframe if possible.

A following table illustrates a time relationship to transmit ACK/NACK with respect to a plurality of DL subframes corresponding to one UL frame.

TABLE 9

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8 7, 5, 4, 11 6 | — | — | — | — | — | — | — |
| 6 | — | — | 7 | 7 | 5 | — | — | 7 | 7 | — |

In the table 9, a subframe 2 of an UL-DL configuration 0 is an UL subframe, and the subframe 2 indicates that ACK/NACK with respect to data received from a DL subframe before 6 subframe are transmitted. Each UL subframe may transmit a plurality of ACK/NACK using ACK/NACK bundling and ACK/NACK multiplexing. A part of k values in the table 9 corresponds to a special subframe. For example, a group K with respect to a subframe 2 in an UL-DL configuration includes components of {13, 12, 9, 8, 7, 5, 4, 11, 6}. In this case, the component 11 corresponds to a special subframe.

Meanwhile, the ACK/NACK includes ACK/NACK with respect to the PDSCH scheduled by a PDCCH and ACK/NACK with respect to the PDCCH. For example, the ACK/NACK with respect to the PDCCH may include ACK/NACK with respect to DL SPS release PDCCH. The PDCCH resource used to transmit ACK/NACK may be implicitly determined as a resource corresponding to the PDCCH. That is, a resource linked with the lowest CCE index among CCEs configuring DL scheduling PDCCH with respect to a specific UE may be a PUCCH resource (implicit PUCCH resource) to transmit the ACK/NACK.

The above implicit PUCCH resource is defined only corresponding to 1) a UL subframe after 4 subframe in a DL subframe of the FDD, and 2) DL subframe-UL subframe of the table 9 in the TDD.

Meanwhile, the ACK/NACK may include ACK/NACK with respect to a PDSCH to be scheduled without the PDCCH. For example, ACK/NACK with respect to a PDSCH due to an SPS is this case. In this case, since there is no PDCCH corresponding to the PDSCH, the above implicit PUCCH resource may not be determined.

Accordingly, the base station may report a PUCCH resource to transmit ACK/NACK to the UE in such a manner that the base station previously allocates a plurality of resources through a higher layer signal such as an RRC message, and designates one from a plurality of resources through ARI (ACK/NACK resource indicator). The PUCCH resource by the above scheme refers to an explicit PUCCH resource. The ARI may be included in a PDCCH to activate the SPS, and may adopt a TPC (transmission power control) field.

When the LTE-A transmits ACK/NACK through PUCCH format 1a/1b (or PUCCH format 1a/1b using channel selection), ACK/NACK with a PDSCH scheduled by a PDCCH located at a primary cell, ACK/NACK with respect to the PDCCH use a PUCCH implicitly indicated from the PDCCH of the primary cell.

When a non-cross carrier scheduling is applied so that ACK/NACK with respect to a PDSCH of a secondary cell scheduled by a PDCCH of the secondary cell and ACK/NACK with respect to a PDSCH without a corresponding PDCCH additionally exist, ACK/NACK are transmitted by selectively using 1) an implicit PUCCH resource linked with a CCE index occupied by a PDCCH of the primary cell and an explicit PUCCH resource indicated by the ARI are, or 2) by selectively using an explicit PUCCH resource for a PDSCH without a corresponding PDCCH and an explicit PUCCH resource for a secondary cell.

Meanwhile, all ACK/NACK are transmitted to only the primary cell. When a PUCCH resource of a primary cell corresponding to a CCE occupied by a PDCCH of the secondary cell is defined, the PUCCH resource may collide with a PUCCH resource of a primary cell corresponding to a CCE occupied by a PDCCH of the primary cell. In order to avoid the above problem and a problem which unnecessarily ensures too many PUCCH resources, mapping of the CCE and the implicit PUCCH resource is not defined between different carriers (cells). Further, in a case of the SPS, since there is no PDCCH, an implicit PUCCH resource corresponding to a CCE configuring the PDCCH may not be selected.

Figure 12:
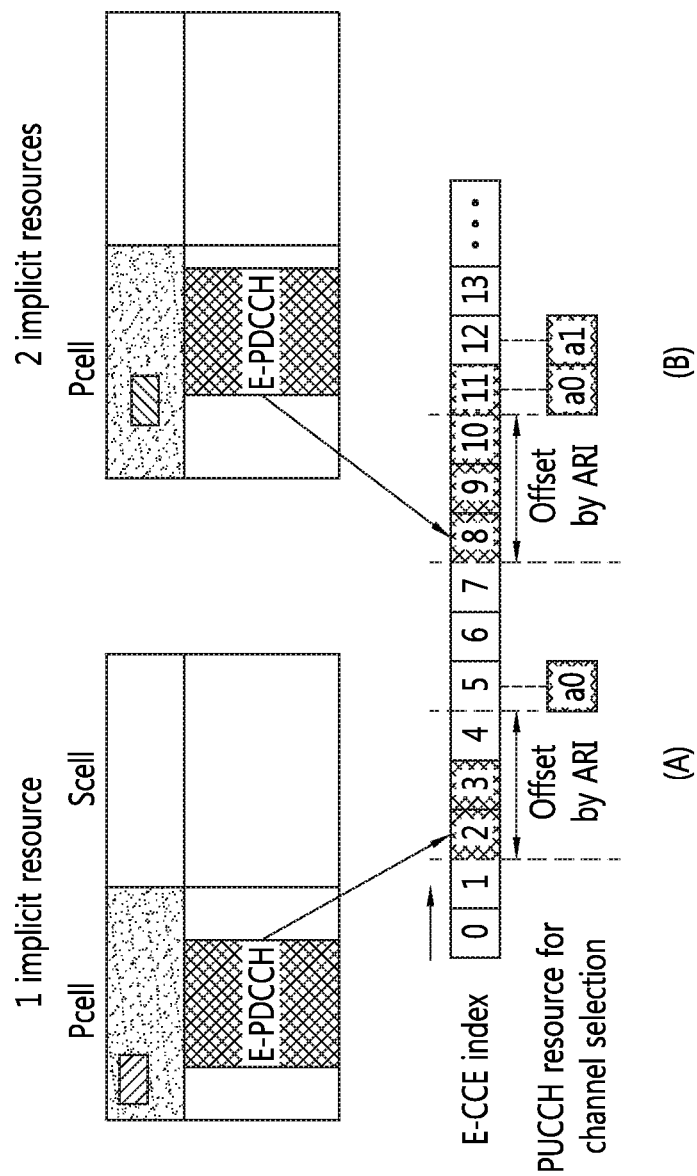
FIG. 12 illustrates an example of a method of setting offset according to an ARI included in an E-PDCCH.

FIG. 12 illustrates an example of a method of setting offset according to an ARI included in an E-PDCCH.

Referring to FIG. 12, mapping of an E-PDCCH and an implicit PUCCH resource may allocate an implicit resource using an E-CCE index configuring an E-PDCCH and a PUCCH index corresponding to an offset value by an ARI.

In detail, FIG. 12(A) illustrates an example of mapping of one implicit PUCCH resource corresponding to an E-CCE, and FIG. 12(B) illustrates an example of mapping of two implicit PUCCH resources corresponding to an E-CCE.

As shown in FIG. 12(A), a sum of offset value according to the lowest index among indexes of E-CCEs configuring an E-PDCCH and the ARI, that is, a PUCCH resource a0 corresponding to a first index $(n_{E\text{-}CCE})+\text{Offset}_{ARI}$ of the E-CCE may be used to transmit ACK/NACK.

Alternatively, as shown in FIG. 12(B), two PUCCH resources a0 and a1 corresponding to $n_{E\text{-}CCE}+\text{Offset}_{ARI}$, $n_{E\text{-}CCE}+1+\text{Offset}_{ARI}$ may be used to transmit ACK/NACK.

When an implicit PUCCH resource is selected from an E-PDCCH in a single cell in an FDD, FIG. 12(A) is applicable when an E-PDCCH scheduling a PDSCH being a 1 CW transmission mode in channel selection selects the implicit PUCCH resource.

FIG. 12(B) illustrates a case where two PUCCH resources are required to be ensured from an E-CCE occupied by an E-PDCCH. For example, FIG. 2(B) is applicable when an E-PDCCH scheduling a PDSCH in a maximum 2 CW transmission mode in channel selection selects the implicit PUCCH resource. Alternatively, FIG. 12(B) is applicable to select the implicit PUCCH resource in an E-PDCCH when a SORTD is used.

<Method of Configuring PUCCH Resource Corresponding to an E-PDCCH by Subframes in a TDD>

Hereinafter, a method of configuring a PUCCH resource corresponding to an E-PDCCH in a TDD will be described.

According to the related art, when the PDSCH is scheduled due to a PDCCH, a PUCCH resource (for PUCCH format 1a/1b) to transmit ACK/NACK with respect to a PDSCH is configured by a following method.

1) FDD.

$$n_{PUCCH}^{(1,\tilde{p}0)}=n_{CCE}+N_{PUCCH}^{(1)} \quad \text{[Equation 3]}$$

That is, an index $n_{PUCCH}^{(1,\tilde{p}0)}$ to set a PUCCH resource in the FDD is given by the lowest CCE index nCCE of the PDCCH and a value $N^{(1)}_{PUCCH}$ provided from the higher layer.

2) TDD.

$$n_{PUCCH}^{(1,\tilde{p}0)}=(M-m-1)\cdot N_c+m\cdot N_{c+1}+n_{CCE}+N_{PUCCH}^{(1)} \quad \text{[Equation 4]}$$

In the TDD, $N^{(1)}_{PUCCH}$ with respect to an antenna port p0 is set according to a higher layer. An $n_{CCE}$ is a number of a first CCE used to transmit the PDCCH in a subframe n-km. Referring to the table 9, when the UE detects a PDCCH from the subframe n–$k_m$, m and $k_m$ have the smallest value of the group K. First, the UE selects a value c satisfying $N_c \leq n_{CCE} \leq N_{C+1}$ from {0,1,2,3}. $N_C$ is given by a following equation 5.

$$N_c=\max\{0,\lfloor[N_{RB}^{DL}\cdot(N_{sc}^{RB}\cdot c-4)]/36\rfloor\} \quad \text{[Equation 5]}$$

In the equation 5, the $N^{DL}_{RB}$ represents the number of resource blocks at a downlink band, and the $N^{RB}_{sc}$ represents the number of sub-carriers in a resource block.

Meanwhile, when a plurality of DL subframes are linked with one UL subframe in the TDD as listed in the table 9, PUCCH resources corresponding to CCEs occupied by respective PDCCH of the DL subframes are configured not to collide with each other.

Figure 13:
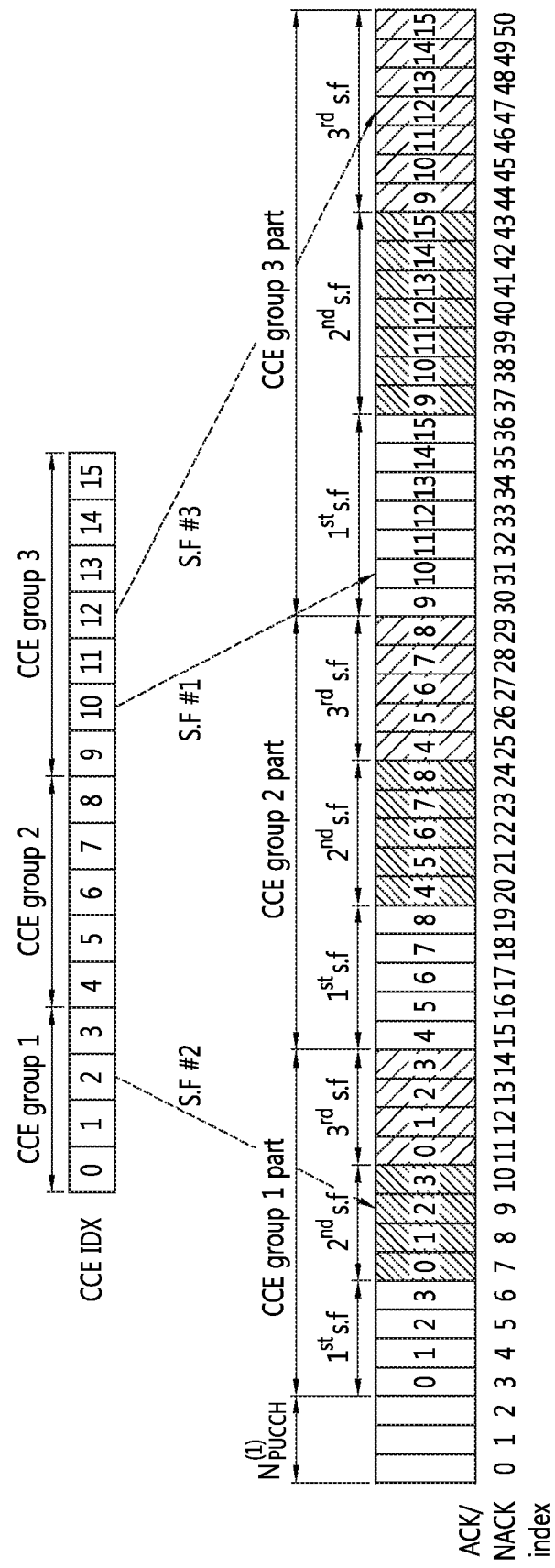
FIG. 13 illustrates an example of a configuration of a PUCCH resource corresponding to a CCE.

FIG. 13 illustrates an example of a configuration of a PUCCH resource corresponding to a CCE.

For example, a CCE group 1 corresponds to CCEs included in one OFDM symbol, a CCE group 2 corresponds to CCEs included in two OFDM symbols, and the CCEs corresponding to the CCE group 1 are excluded from the CCE group 2. A CCE group 3 corresponds to CCEs included in three OFDM symbols, and the CCEs corresponding to the CCE group 1 and the CCE group 2 are excluded from the CCE group 3.

Meanwhile, an offset value indicating a start point of a PUCCH resource corresponding to a control channel in the whole PUCCH index (or ACK/NACK index) may be defined as follows.

$N^{(1)}_{PUCCH}$: indicates a start index of an implicit PUCCH resource corresponding to a CCE of the PDCCH.

$N^{(1)}_{PUCCH\_E-PDCCH,SET0}$: indicates a start index of an implicit PUCCH resource corresponding to an E-CCE of an E-PDCCH group 0.

$N^{(1)}_{PUCCH\_E-PDCCH,SET1}$: indicates a start index of an implicit PUCCH resource corresponding to an E-CCE of an E-PDCCH group 1.

The E-PDCCH group 0, 1 refers to E-PDCCH-PRB-group 0, 1. An PRB means a physical resource block.

<RRC set Of $N^{(1)}_{PUCCH\_E-PDCCH,SET0}$, $N^{(1)}_{PUCCH\_E-PDCCH,SET1}$>

A method of setting a start index an implicit PUCCH corresponding to an E-CCE of an E-PDCCH group will be described.

It is preferable that a start point of the implicit PUCCH resource (hereinafter, E-PDCCH implicit PUCCH resource) corresponding to the E-CCE is configured not to collide with an implicit PUCCH resource (hereinafter PDCCH implicit PUCCH resource). Accordingly, it is preferable that an offset $N^{(1)}_{PUCCH\_E-PDCCH}$ indicating a start point of an E-PDCCH implicit PUCCH resource is configured after a termination point of a PDCCH implicit PUCCH resource.

This is expressed by a following equation 6.

$$N_{PUCCH\_E-PDCCH}^{(1)} \geq M \cdot N_c + N_{PUCCH}^{(1)} \qquad \text{[Equation 6]}$$

In the equation 6, $N_c = \max\{0, \lfloor [N_{RB}^{DL} \cdot (N_{sc}^{RB} \cdot c - 4)]/36 \rfloor\}$, the c is signaled to RRC, or is determined by taking a maximum PDCCH according to a frequency band or may be a maximum PCFICH value of DL subframes corresponding to an UL subframe. For example, the c may be {0,1,2,3} or {1,2,3}.

In detail, $N^{(1)}_{PUCCH\_E-PDCCH,SET0}$, $N^{(1)}_{PUCCH\_E-PDCCH,SET1}$ are applicable as follows.

1) Case of FDD $N^{(1)}_{PUCCH\_E-PDCCH,SET0}$, $N^{(1)}_{PUCCH\_E-PDCCH,SET1}$ may be set to a specific value regardless of $N^{(1)}_{PUCCH}$. In this case, a location of a PUCCH resource may be flexibly set in the whole uplink system band. Here, $N^{(1)}_{PUCCH\_E-PDCCH,SET0}$, $N^{(1)}_{PUCCH\_E-PDCCH,SET1}$ may be the same range as $N^{(1)}_{PUCCH}$.

Alternatively, $N^{(1)}_{PUCCH\_E-PDCCH,SET0}$, $N^{(1)}_{PUCCH\_E-PDCCH,SET1}$ may be set as a relative value from the $N^{(1)}_{PUCCH}$. Overlap between a resource corresponding to a CCE of the PDCCH and a resource corresponding to an E-CCE of an E-PDCCH may be adjusted. Further, a relative application is possible by subframes.

For example, a following equation is applicable.

$$n_{PUCCH}^{(1,\tilde{p}0)} = n_{e-CCD,setx} + N_{PUCCH}^{(1)} + N_{PUCCH\_E-PDCCH,setx}^{(1)} \qquad \text{[Equation 7]}$$

Further, $N^{(1)}_{PUCCHE\_PDCCH,SET0}$, $N^{(1)}_{PUCCHE\_PDCCH,SET1}$ may be set as a relative value by taking $N^{(1)}_{PUCCH}$ and an implicit PUCCH resource corresponding to the CCE of the PDCCH into consideration and may be set at a region not to collide with the PDCCH implicit PUCCH resource. In addition, $N^{(1)}_{PUCCH\_E-PDCCH,SET0}$, $N^{(1)}_{PUCCH\_E-PDCCH,SET1}$ may be set not to collide with an explicit PUCCH resource.

For example, $N_{PUCCH\_E-PDCCH\_0} = N_c + N_{PUCCH}^{(1)}$ may be set, $n_{PUCCH}^{(1,\tilde{p}0)} = n_{e-CCE,setx} + N_{PUCCH\_E-PDCCH\_0} + N_{PUCCH\_E-PDCCH,setr}^{(1)}$.

2) Case of TDD.

$N^{(1)}_{PUCCH\_E-PDCCH,SET0}$, $N^{(1)}_{PUCCH\_E-PDCCH,SET1}$ may be set to a specific value regardless of $N^{(1)}_{PUCCH}$. In this case, a location of a PUCCH resource may be flexibly set in the whole uplink system band. $N^{(1)}_{PUCCH\_E-PDCCH,SET0}$, $N^{(1)}_{PUCCH\_E-PDCCH,SET1}$ may have the same range as that of $N^{(1)}_{PUCCH}$.

Alternatively, $N^{(1)}_{PUCCH\_E-PDCCH,SET0}$, $N^{(1)}_{PUCCH\_E-PDCCH,SET1}$ may be set to a relative value from $N^{(1)}_{PUCCH}$. Overlap between the PDCCH implicit PUCCH resource and an E-PDCCH implicit PUCCH resource may be adjusted. Further, a relative application is possible by subframes.

For example, a following equation is applicable.

$$n_{PUCCH}^{(1,\tilde{p}0)} = n_{e-CCE,setx} + N_{PUCCH}^{(1)} + N_{PUCCH\_E-PDCCH,setx}^{(1)} \qquad \text{[Equation 8]}$$

Further, $N^{(1)}_{PUCCH\_E-PDCCH,SET0}$, $N^{(1)}_{PUCCH\_E-PDCCH,SET1}$ may be set as a relative value by taking $N^{(1)}_{PUCCH}$ and an implicit PUCCH resource with respect to a plurality of DL subframe corresponding to one UL subframe into consideration and may be set at a region not to collide with the PDCCH implicit PUCCH resource. In addition, $N^{(1)}_{PUCCH\_E-PDCCH,SET0}$, $N^{(1)}_{PUCCH\_E-PDCCH,SET1}$ may be set not collide with the explicit PUCCH resource. The explicit PUCCH resource may include a PUCCH resource with respect to an SPS PDSH.

For example, the value may be set by a following equation 9.

$$N_{PUCCH\_E-PDCCH\_0}^{(1)} = M \cdot N_c + N_{PUCCH}^{(1)}$$

$$n_{PUCCH}^{(1,\tilde{p}0)} = N_{PUCCH\_E-PDCCH\_0}^{(1)} + N_{PUCCH\_E-PDCCH,setr}^{(1)} \text{ when } n_{e-CCE,setx} = 0 \qquad \text{[Equation 9]}$$

Meanwhile, $N^{(1),PDCCHtotal}_{PUCCH}$ may be set as follows.

1) fixed value: the number of implicit PUCCH resources corresponding to a PDCCH according to a determined rule may be determined similar to a possible maximum value the number of PUCCH resources. When a maximum value of the number of PUCCH resources is applied, if downlink scheduling using the PDCCH is small, the PUCCH resource is consumed. When the fixed value is set an insufficient value, a collision probability between the PUCCH implicit PUCCH resource and an E-PDCCH implicit PUCCH resource is increased.

2) Value signaled to RRC: unlike the fixed value of 1), a network may adjust overlay between the PDCCH implicit PUCCH resource and the E-PDCCH implicit PUCCH resource to increase flexibility of resource use.

3) preset Ng (PHICH resource), PHICH interval (PHICH duration), presence of PHICH in a subframe, and the greatest value of the total number $N_{CCE}$ of $n_{CCE}$ when a maximum span of a PDCCH according a frequency band occurs: may be set to completely avoid collision between the PDCCH implicit PUCCH resource (that is, PUCCH resource corresponding to CCE) and the E-PDCCH implicit PUCCH resource (that is, PUCCH resource corresponding to an E-CCE).

4) $N_{CCE}$ of a PDCCH region in a subframe having a maximum PCFICH value from a DL subframe corresponding to an UL subframe 5) A maximum value of $N_{CCE}$ at a PDCCH region in each DL subframe corresponding to an UL subframe: other value may be used when a subframe without PHICH is considered.

A method of determining a value c from $N_C$ will be described.

1) First, a PUCCH resource corresponding to a CCE may be effectively set using $N_C$ defined in an existing TDD.

2) A fixed value is used: a minimum c value including the maximum number of CCEs generated from each frequency band may be used. For example, if $N^{DL}_{RB}>10$, c=3. If $N^{DL}_{RB}\leq 10$, c=4.

3) A value signaled to the RRC is used: unlike the fixed value of 1), a network may adjust overlay between the PUCCH resource corresponding to the CCE and the PUCCH resource corresponding to an E-CCE to increase flexibility of resource use.

4) A maximum PCFICH value of DL subframes corresponding to a UL subframe is used.

resource by taking presence of the E-CCE used for the E-PDCCH and how much PUCCH resource is needed for the E-CCE.

1. The E-PDCCH may require to exclude PUCCH resource indexing with respect to a subframe which is not cell-specifically. Following 1 to 3) is an example of a subframe in which the E-PDCCH may not exist.

1) Special subframe in which the PDSCH may not be transmitted.

A following table 10 indicates an example of a special subframe configuration.

TABLE 10

| | | Normal cyclic prefix in downlink | | | Extended cyclic prefix in downlink | |
|---|---|---|---|---|---|---|
| | | | UpPTS | | | UpPTS |
| | | | Normal | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

5) A UE selects a value c' satisfying $N_{C'}\leq N_{CCE}\leq N_{C'+1}$ from {0,1,2,3} based on a preset Ng (PHICH resource), a PHICH interval (PHICH duration), presence of PHICH in a subframe, and the greatest value of the total number $N_{CCE}$) of $n_{CCE}$ when a maximum span of a PDCCH according a frequency band occurs. c=c'+1.

6) The UE selects c' satisfying $N_{C'}\leq N_{CCE}\leq N_{C'+1}$ from {0,1,2,3} based on $N_{CCE}$ of a PDCCH region in a DL subframe having a maximum PCFICH value of DL subframes corresponding to a UL subframe. The c=c'+1.

7) The UE selects c' satisfying $N_{C'}\leq N_{CCE}\leq N_{C'+1}$ from {0,1,2,3} based on $N_{CCE}$ of a PDCCH region in each DL subframe corresponding to a UL subframe to use the greatest c. The c=c'+1.

In the above methods, different values may be set by frequency bands or UL subframes. An applying method based on the PCFICH may be weak against a decoding error. However, when the error possibility is low or there is no error, consumption of the PUCCH resource can be significantly reduced while avoiding resource collision.

In the above methods, parameters may be cell-specifically given in order to easily avoid collision. However, when a main purpose of the used ARI is to avoid collision between a PUCCH resource corresponding to a PDCCH and a PUCCH resource corresponding to an E-PDCCH, the ARI may be UE-specifically given.

<Reservation of E-PDCCH Implicit PUCCH Resource by Subframes in TDD>

The following is a description regarding by which scheme a PUCCH resource (E-PDCCH implicit PUCCH resource) corresponding to an E-CCE of an E-PDCCH is reserved and indexed. Particularly, when a method of avoiding collision between resources by subframes is applied, if there is no E-CCE of the E-PDCCH or a subframe having the small number of E-CCEs is not considered, PUCCH resource consumption may unnecessarily occur. Accordingly, there is a need for a method of reserving and indexing a PUCCH For example, in the table 10, special subframes according to special subframe configuration #0, #5 in a normal CP (downlink) or special subframe configuration #0, #4 in an extended CP (downlink) may be a special subframe which does not transmit the PDSCH. Since DwPTS is too short or DM-RS (demodulation reference signal) being UE specific reference signal is not defined in the special subframe, it is difficult to transmit the PDSCH.

2) Subframe where all E-CCE correspond to a resource block to which the DM-RS is not transmitted For example, in a special subframe of a special subframe configuration #7 in an extended CP, transmission of DM-RS is not set. Accordingly, an E-PDCCH for demodulation based on the DM-RS is not transmitted. Thus, the PDSCH due to the E-PDCCH is not transmitted. As another example, a case of overlapping all E-CCEs of the E-PDCCH group with PBCH/PSS/SSS may correspond to this case.

3) Subframe where some E-CCEs correspond to a resource block to which the DM-RS is not transmitted: when a resource block allocated to the E-PDCCH overlaps with a resource block to which PBCH/PSS/SSS is transmitted, indexing with respect to a corresponding subframe may be omitted. Further, other operation may be performed according to whether an allocating scheme of the E-CCE is localized or distributed. For example, when the allocating scheme of the E-CCE is localized, the number of E-CCEs which do not collide with each other is reserved. When the allocating scheme of the E-CCE is distributed, if a part of the E-CCEs collides, reservation with respect to the whole group may not be performed.

2. A method of excluding PUCCH resource indexing with respect to a subframe in which monitoring of the E-PDCCH is not set to RRC signaling.

The particular subframe is a subframe which is RRC signaled to monitor the E-PDCCH. It is assumed that the particular subframe is an MBSFN subframe. In this case, in a subframe in which the UE detects transmission of a PMCH in the particular subframe, the E-PDCCH of a corresponding region is not monitored and the PDCCH is monitored.

Accordingly, PUCCH resource indexing with respect to a subframe to which the PMCH is transmitted is excluded. However, presence of transmission of the PMCH may not be known according to the UE. Accordingly, in order to unite a use of the resource, the index may not be excluded.

3. A method of excluding PUCCH resource indexing with respect to a subframe in which PRS (positioning reference signal) is set.

When the UE is set to monitor an E-PDCCH in an MBSFN through a higher layer, if the PRS is set to be generated in only the MBSFN subframe and a normal CP is used in a subframe #0 of the same cell, the UE monitors a UE specific search space of the PDCCH. However, presence of transmission of the PRS may not be known according to the UE, in order to unite the use of the resource, the indexing may not be excluded.

4. A method of reducing indexing with respect to a subframe to half where only at least two E-CCEs in the E-PDCCH are used as an aggregation level.

For example, PUCCH indexing with respect to only even numbered E-CCEs of each subframe is performed. Since the minimum E-CCE aggregation level is different according to the UE, in order to unite the use of the resource, the index may be used without being reduced to half 5. A method of reducing indexing with respect to a subframe having the small number of E-CCEs in the E-PDCCH to half based on the number of E-CCEs. Since the minimum number of E-CCEs is different according to the UE, the number of E-CCEs in a normal subframe or the possible maximum number of E-CCEs in the allocated E-PDCCH resource block maintains without reducing uniting of the use of the resource.

1) When a part of OFDM symbols of a resource block corresponding to the E-PDCCH group is reduced, the corresponding number of the reduced E-CCEs is excluded. 2) Alternatively, when a DM-RS is not set to a resource block corresponding to the E-PDCCH group, the same number of E-CCEs corresponding to the number of the resource blocks may be excluded.

In particular, when a partial PRB pair of the E-PDCCH group collides with PBCH/PSS/SSS so that a partial E-CCE may not be defined, the number of the E-CCEs which cannot be defined may be excluded. For example, when at least one of E-REGs configuring the E-CCE collides with PBCH/PSS/SSS, the E-CCE may not be defined. An arrangement of a resource block of the E-REG configuring the E-CCE may be changed according to whether the E-PDCCH group is localized or distributed. Although the E-CCE is defined in the localized E-PDCCH group but the E-CCE cannot be defined in the distributed E-PDCCH group.

3) When a corresponding UE may receive E-PDCCH/PDSCH in a PRS transmission subframe, a resource block corresponding to the E-PDCCH group may overlap with a PRS transmission resource block. In this case, the number of E-CCEs may be reduced. Accordingly, the same number of E-CCEs corresponding to the reduced number may be excluded from indexing. Since presence of transmission of the PRS cannot be known according to the UE, in order to unite the use of the resource, the E-CCEs may not be excluded from the indexing.

The above methods are applicable by a combination of all or some by taking flexibility and robust of the use of the PUCCH resource.

The E-PDCCH group and the monitoring subframe are UE-specifically set. Accordingly, the above methods may be a method of reducing unnecessary E-CCE and PUCCH mapping in a UE aspect.

Meanwhile, the configuration of the E-PDCCH may be changed by UEs in a system side. Accordingly, there may be a demand to cell-specifically operate the mapping relationship between the E-CCE and the PUCCH. When considering such a point, there may be a need to set the mapping relationship between the E-CCE and the PUCCH with respect to all subframes to which the E-PDCCH may be set.

Among subframes in which monitoring of the E-PDCCH is not RRC signaling set, PUCCH resource reservation for all DL subframes being a target of ACK/NACK transmission may be performed by taking the E-CCE of the E-PDCCH.

Exceptionally, the setting of the PDSCH may exclude indexing with respect to cell-specifically impossible subframe. For example, the special subframe to which the PDSCH is not transmitted, and a special subframe corresponding to special subframe configurations #0,#5 in a normal CP or special subframe configurations #0,#4 in an extended CP may be a subframe capable of not setting the PDSCH.

Further, as a subframe without the E-PDCCH, indexing with respect to a subframe where all E-CCEs correspond to resource blocks to which the DM-RS is not transmitted, may be excluded. A case where all E-CCEs among the special subframe configuration #7 in the extended CP, and the E-PDCCH group overlap with PBCH/PSS/SSS may correspond to the above case.

The above methods are applied to setting offset of the indexing and an index m corresponding to the DL subframe may be skipped according to presence of collision allowance of the PUCCH resource between PDCCH/E-PDCCH and presence of collision allowance of the PUCCH resource between the E-PDCCH groups.

1. When collision of the PUCCH resource between the E-PDCCH groups.

1) The collision of the PUCCH resource between the subframes may be allowed. Since offset is not applied between the subframes or the E-PDCCH groups, and a collision possibility of the resource is high, there is a need to use the ARI together.

2) The collision of the PUCCH resource between subframes may not be allowed.

In this case, an offset value of each subframe may use i) the fixed number of the E-CCEs, ii) commonly uses a maximum value the number of the E-CCEs between the E-PDCCH groups, and iii) use an independent value.

Figure 14:
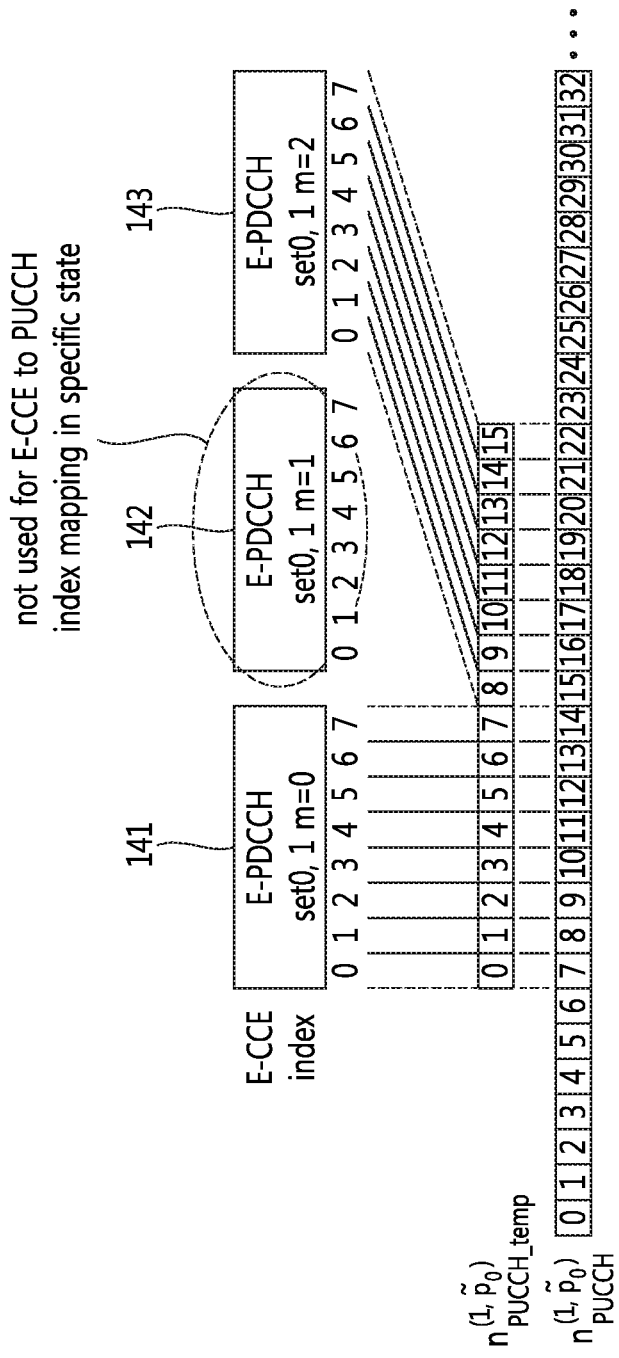
FIG. 14 illustrates an example of an E-PDCCH implicit PUCCH resource when PUCCH resource collision between subframes is not allowed.

FIG. 14 illustrates an example of an E-PDCCH implicit PUCCH resource when PUCCH resource collision between subframes is not allowed. That is, FIG. 14 illustrates an example of mapping a PDCCH resource (in detail, PUCCH index) to the E-CCEs included in a plurality of subframes. Hereinafter, m is m with respect to $\{k_m\}$ included in a group K.

Referring to FIG. 14, an implicit PUCCH resource corresponding to E-CCEs of an E-PDCCH group 0, 1 (141) of a DL subframe corresponding to m=0, an E-PDCCH group 0, 1 (142) of the DL subframe corresponding to m=1, and an E-PDCCH group 0, 1 (143) of the DL subframe DL subframe corresponding to m=2, (143) may be determined. In this case, it is assumed that the DL subframe corresponding to m=1 is a subframe capable of not transmitting the E-PDCCH, for example, a special subframe corresponding to special subframe configuration #0,#5 in a normal CP and special subframe configuration #0,#4, #7 in a normal CP. The E-CCEs of a DL subframe corresponding to the m=1 in determining an E-PDCCH implicit PUCCH resource, corresponding to E-PDCCH groups 0, 1(141) of a DL subframe corresponding to m=0, and an E-CCE of E-PDCCH groups 0, 1(143) of a DL subframe corresponding to m=0.

3) the collision of the PUCCH resource between E-PDCCH group may not be allowed. In this case, i) the PUCCH resources may be arranged in the order of the subframe E-PDCCH FIG. 15 illustrates an example of mapping an E-CCE to the PUCCH resource in the order of the subframe—the E-PDCCH.

Figure 15:
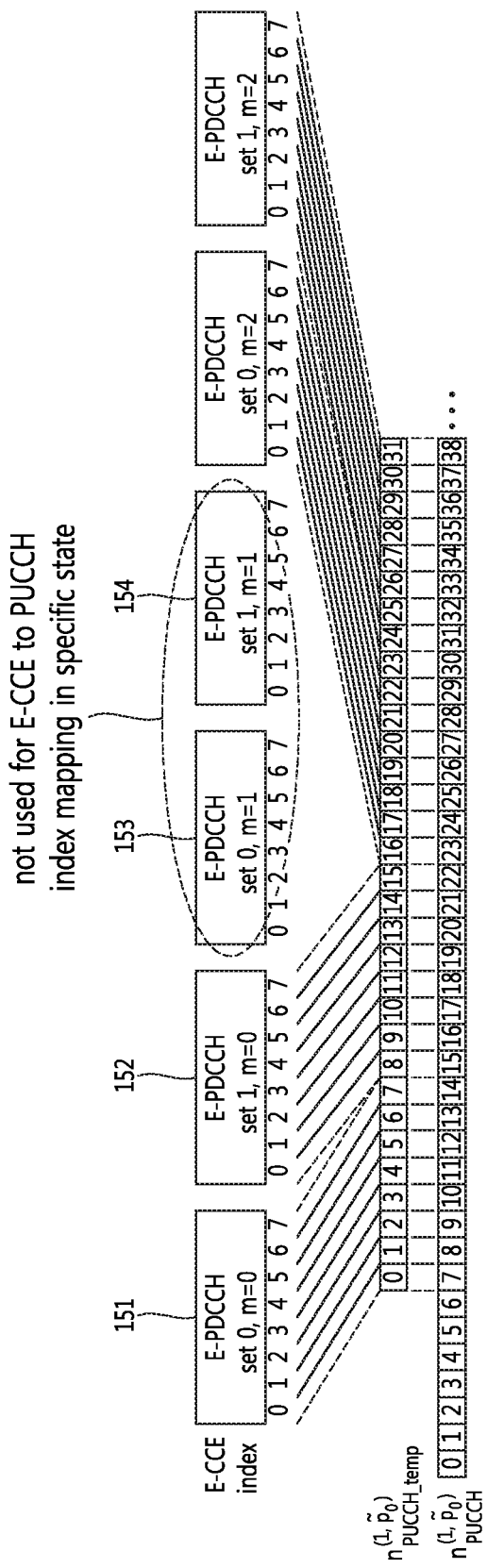
FIG. 15 illustrates an example of mapping an E-CCE to the PUCCH resource in the order of the subframe—the E-PDCCH.

Referring to FIG. 15, the E-CCE is mapped the PUCCH resource in the E-CCE order of an E-PDCCH group 0(151) of a DL subframe corresponding to m=0, an E-PDCCH group 1(152) of a DL subframe corresponding to m=0, an E-PDCCH group 0(153) of a DL subframe corresponding to m=1, an E-PDCCH group 1(154) of a DL subframe corresponding to m=1. That is, in the order of the subframe and the E-PDCCH group, the E-CCE is implicitly mapped to the PUCCH resource. In this case, the special E-PDCCH group (for example, the 153, 154) may be omitted from mapping of the E-CCE to the PUCCH resource. For example, a case of the special subframe in which a DL subframe corresponding to m=1 cannot transmit the E-PDCCH may correspond to the above case.

An offset value of each subframe and the E-PDCCH group may use the fixed number of the E-CCEs (may use a common value or different values between the E-PDCCH groups) or an independent value (is applicable only when an initial value is independently set by E-PDCCH groups or only when types of the E-PDCCH groups are different from each other).

Alternatively, the E-PDCH and the subframe may be arranged in the order of the E-PDCCH—the subframe.

Figure 16:
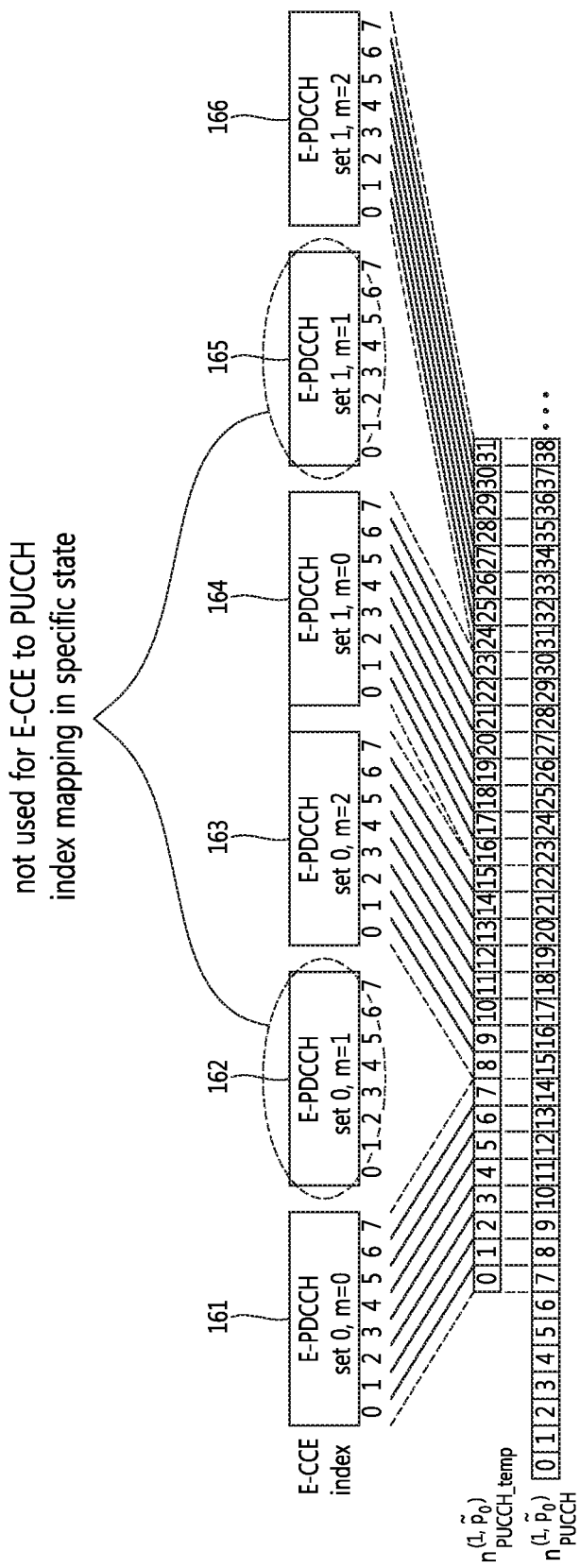
FIG. 16 illustrates an example of mapping the E-CCE to the PUCCH resource in the order of the E-PDCCH—the subframe.

FIG. 16 illustrates an example of mapping an E-CCE to the PUCCH resource in the order of the E-PDCCH—the subframe.

Referring to FIG. 16, the E-CCEs are mapped to the PUCCH resource in the order of an E-PDCCH group 0(161) of a DL subframe corresponding to m=0, an E-PDCCH group 0(162) of a DL subframe corresponding to m=1, an E-PDCCH group 0(163) of a DL subframe corresponding to m=2, an E-PDCCH group 1(164) of a DL subframe corresponding to m=0, an E-PDCCH group 1(165) of a DL subframe corresponding to m=1, and an E-PDCCH group 1(166) of a DL subframe corresponding to m=2. That is, the E-CCE is implicitly mapped to the PUCCH resource in the order of the E-PDCCH group and the subframe. In this case, the special E-PDCCH group (for example, the 162, 165) may be excluded from the mapping of the E-CCE to the PUCCH resource. For example, a special subframe where a DL subframe corresponding to m=1 cannot transmit the E-PDCCH may correspond to the above case.

An offset value of each subframe and the E-PDCCH group may use the fixed number of the E-CCEs (may use a common value or different values between the E-PDCCH groups) or an independent value (is applicable only when an initial value is independently set by E-PDCCH groups or only when types of the E-PDCCH groups are different from each other).

<Setting Collision Avoiding Offset by PDCCHs and PUCCH Resource Subframes in TDD>

1. A method of excluding a PUCCH resource collision between subframes.

This method is performed to prevent resource collision between subframes in an existing case of a PUCCH resource corresponding to the PDCCH. This is for the purpose of performing scheduling without previously considering scheduling a subframe after each subframe is scheduled.

In a case of a PUCCH resource corresponding to an E-CCE of the E-PDCCH, complexity of the scheduling may be reduced by configuring collision between subframes to be avoided. In a case of the FDD, there is no problem about collision of the PUCCH resource between subframes. Accordingly, a design of a scheduler is equally applicable to FDD/TDD.

Alternatively, a method of allowing collision between PDCCH/E-PDCCH group 0/E-PDCCH group 1 corresponding to the same DL subframe may be used.

ALT1.1: is a method of using a region ($N^{(1),PDCCHtotal}_{PUCCH}$) defined between subframes in the PDCCH region and of not allowing collision between E-PDCCH groups in remaining regions. Resource collision between subframes may be reduced with respect to the whole resources corresponding to E-CCE. Meanwhile, it is necessary to further ensure the resources.

There is a need for definition of incremental ($N^{(1)}_{extra}$) by subframes with respect to remaining regions. The increment value is equally applicable regardless of a collision exclusion region by subframes of a PUCCH resource with respect to the PDCCH when collision exclusion by subframes of the PUCCH resource with respect to the E-PDCCH configures mapping of the E-CCE to the PUCCH.

$N_C$ is applied and the C may be used by sequentially increasing the C.

The incremental considering an E-CCE per resource block corresponding to the E-PDCCH may be used. For example, an integer multiple may be used.

A maximum value of the whole E-CCEs of the E-PDCCH group is used as the increment value.

ALT1.2: is a method of using a region ($N^{(1),PDCCHtotal}_{PUCCH}$) defined between subframes in the PDCCH region and of not allowing collision between E-PDCCH groups in remaining regions.

When the ARI is included in the E-PDCCH, there is a PUCCH resource corresponding to an E-CCE of at least twice or an E-CCE used for UL scheduling when an aggregation level of the E-CCE is 2 or greater. Accordingly, a PUCCH resource corresponding to an E-CCE between subframes is shared and the ARI may be selected and used. However, in a case of a PUCCH resource region corresponding to a CCE of an existing PDCCH, collision is avoided between subframes like the related art.

PUCCH indexing corresponding to E-PDCCH group 0, E-PDCCH group 1 in each region by subframe may be performed.

$N^{(1)}_{PUCCH\_E-PDCCH,set0}$, $N^{(1)}_{PUCCH\_E-PDCCH,set1}$ indexes are applied in each region.

Setting is necessary in m=0, an index is increased form next region m=0 when remaining region is set.

Figure 17:
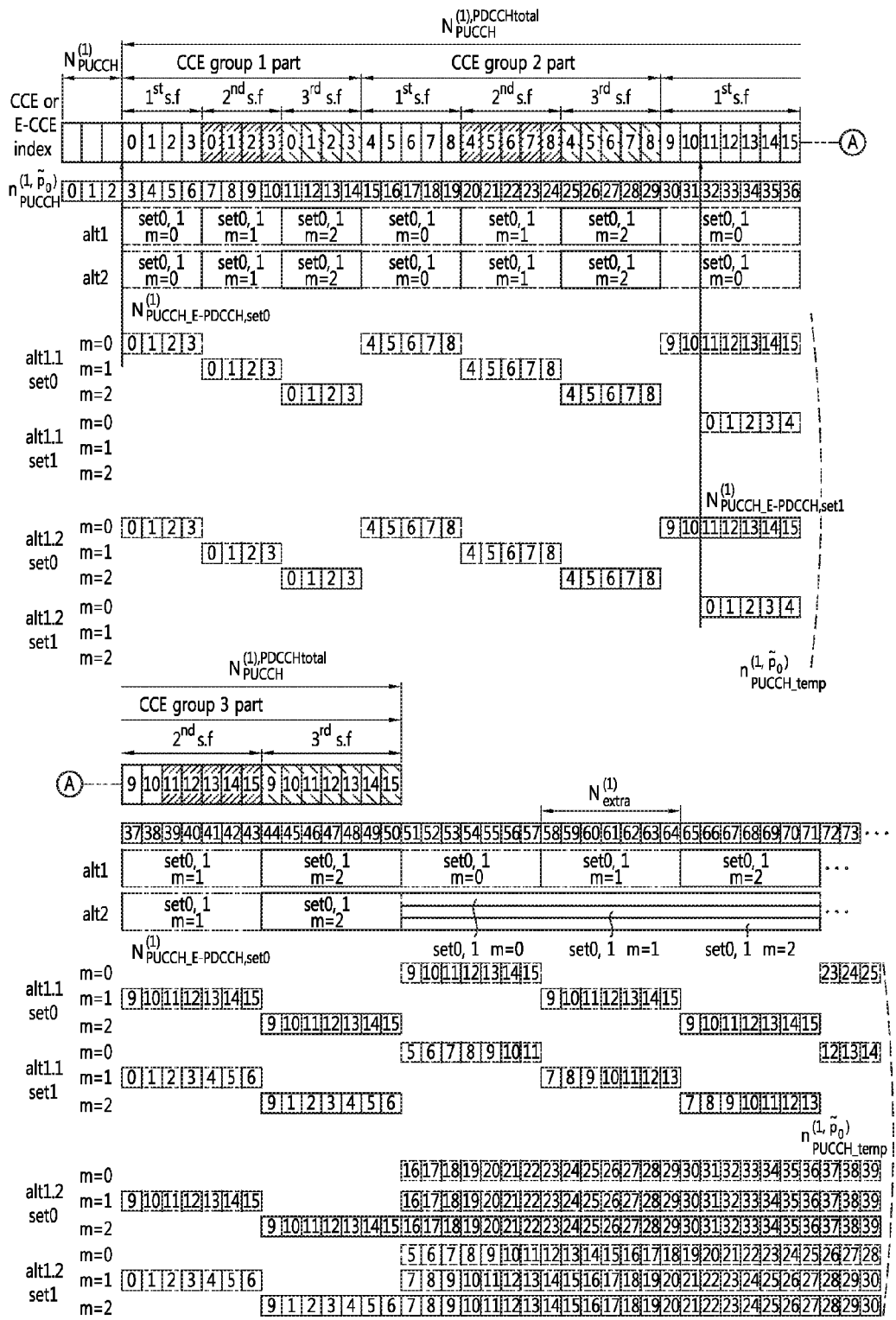
FIG. 17 illustrates an example of mapping the CCE or the E-CCE to the PUCCH resource according to the above ALT1.1, ALT 1.2.

FIG. 17 illustrates an example of mapping the CCE or the E-CCE to the PUCCH resource according to the above ALT1.1, ALT 1.2.

As another method, $N^{(1)}_{PUCCH\_E-PDCCH,set0}$, $N^{(1)}_{PUCCH\_E-PDCCH,set1}$ indexes are applied to each region, and m is applicable to a PUCCH region in which collision between subframes is avoided.

For example, $N^{(1)}_{PUCCH\_E-PDCCH,set0}$, $N^{(1)}_{PUCCH\_E-PDCCH,set1}$ are applied as a first index of each m of CCE group 1, and a third index of each m of a CCE group 3.

An initial value by PUCCH resources with respect to each subframe is applicable to a case of configuring mapping of E-CCE to the PUCCH to exclude collision be subframes of a PUCCH resource with respect to an E-PDCCH regardless of a collision exclusion region by subframes of the PUCCH resource with respect to the PDCCH.

Figure 18:
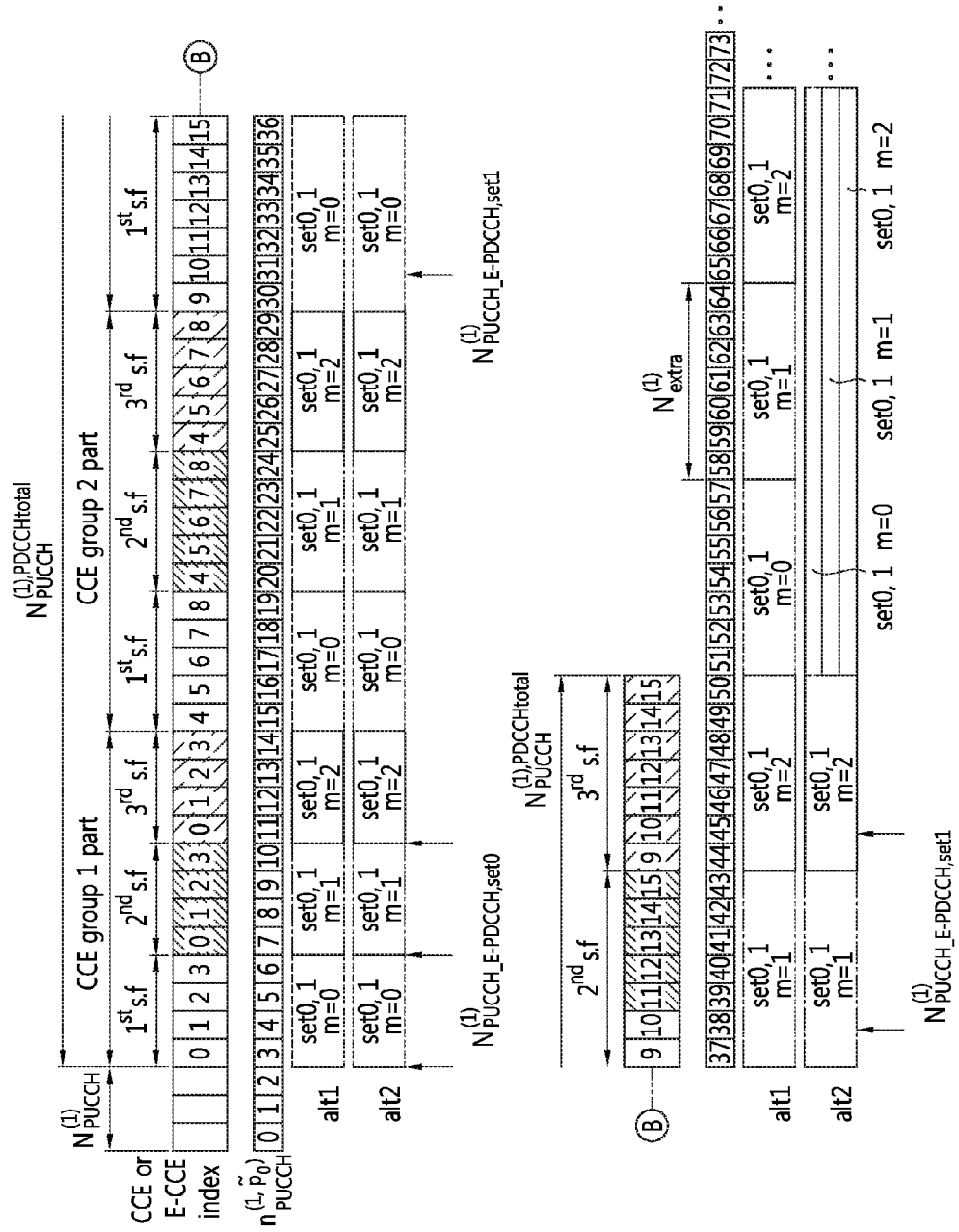
FIG. 18 illustrates an example of applying N(1)PUCCH_E-PDCCH,set0, N(1)PUCCH_E-PDCCH,set1 indexes to m in a PUCCH region in which collision between the subframes is avoided.

FIG. 18 illustrates an example of applying $N^{(1)}_{PUCCH\_E-PDCCH,set0}$, $N^{(1)}_{PUCCH\_E-PDCCH,set1}$ indexes to m in a PUCCH region in which collision between the subframes is avoided.

Meanwhile, collision between PDCCH, E-PDCCH corresponding to the same DL subframe may not be allowed.

The initial value may be set not to collide with a PDCCH by groups or as offset after the PDCCH.

ALT2.1: Collision between E-PDCCH groups may not be allowed at a region different from a region defined between subframes in a PDCCH region.

There is a need to define an increment ($N^{(1)}_{extra}$) by subframes with respect to remaining regions. The increment value is applied to NC, and the C may be used by sequentially increasing the C. An increment considering an E-CCE per resource block corresponding to the E-PDCCH may be used. A maximum value among the whole E-CCE of each E-PDCCH group may be used as the increment value.

ALT 2.2: Collision between E-PDCCH groups may not be allowed.

PUCCH indexing corresponding to E-PDCCH group 0, E-PDCCH group 1 in each region by subframes is performed.

Figure 19:
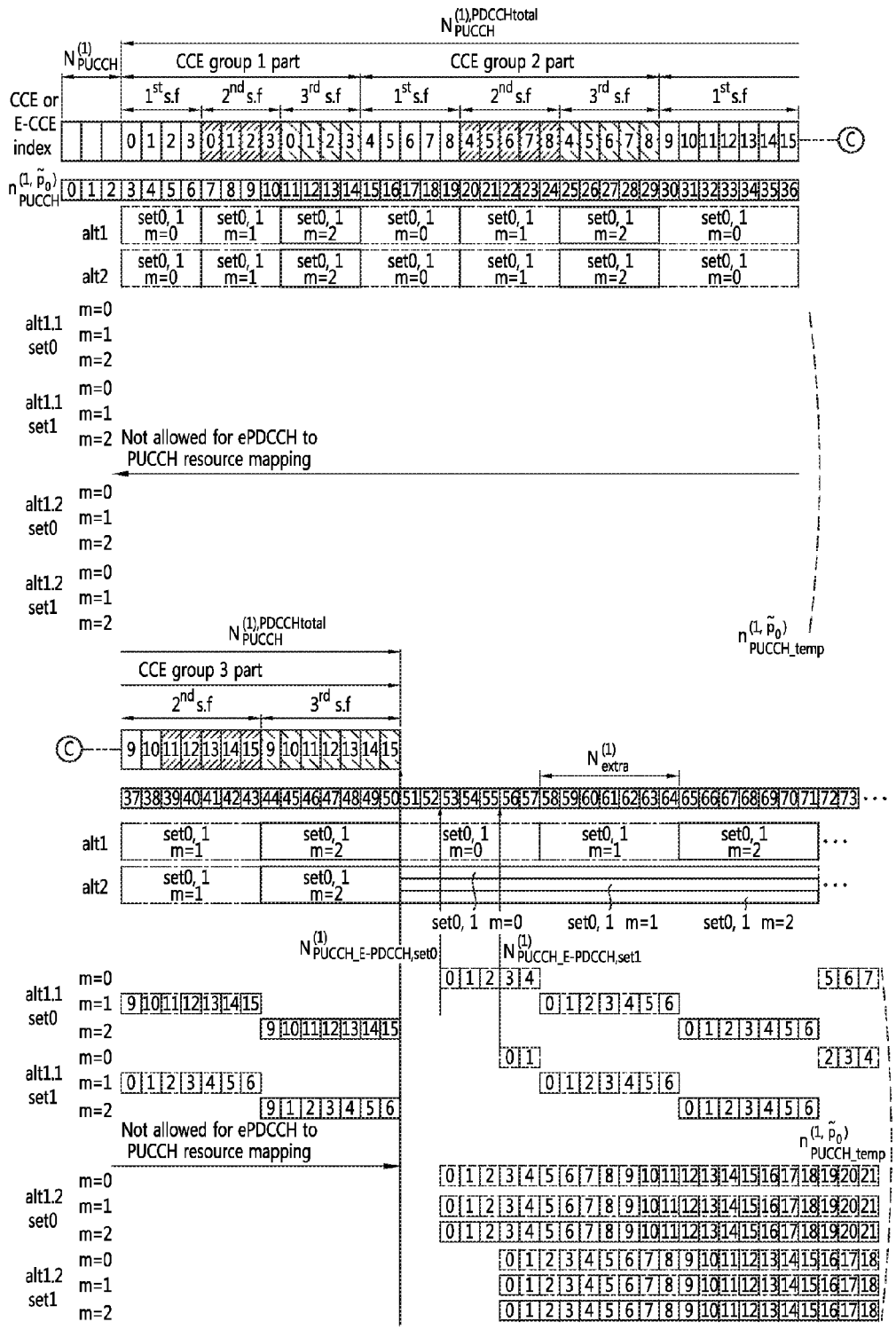
FIG. 19 illustrates an example of mapping the E-CCE to the PUCCH resource when collision between PDCCH/E-PDCCH corresponding to the same DL subframe is not allowed.

FIG. 19 illustrates an example of mapping the E-CCE to the PUCCH resource when collision between PDCCH/E-PDCCH corresponding to the same DL subframe is not allowed.

Meanwhile, in order to reduce scheduling complexity, $N^{(1)}_{PUCCH\_E-PDCCH,set0}$, $N^{(1)}_{PUCCH\_E-PDCCH,set1}$ may be limited such that PUCCH corresponding to E-PDCCH Set 0 and PUCCH corresponding to E-PDCCH Set 1 do not collide with each other.

Meanwhile, when PUCCH corresponding to E-PDCCH Set 0 and PUCCH corresponding to E-PDCCH Set 1 are allowed to collide with each other to reduce the scheduling complexity, $N^{(1)}_{PUCCH\_E-PDCCH,set0}$, $N^{(1)}_{PUCCH\_E-PDCCH,set1}$ values may be set to the same value.

Meanwhile, when PUCCH corresponding to E-PDCCH Set 0 and PUCCH corresponding to E-PDCCH Set 1 are allowed to collide with each other to reduce the scheduling complexity, $N^{(1)}_{PUCCH\_E-PDCCH,set0}$, $N^{(1)}_{PUCCH\_E-PDCCH,set1}$ values may be set to indicate a start point of a PUCCH resource corresponding to PDCCH.

<Mapping of E-PDCCH Implicit PUCCH Resource Mapping>

Figure 20:
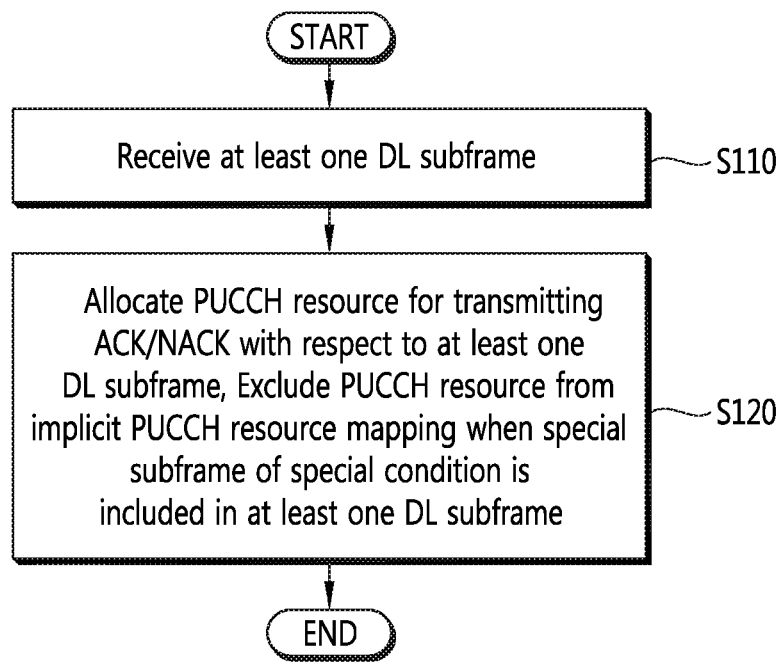
FIG. 20 illustrates a method of allocating the PUCCH resource according to an embodiment of the present invention.

FIG. 20 shows a PUCCH resource allocating method according to an embodiment of the present invention.

In TDD, the UE receives at least one DL subframe (S110). The at least one DL subframe may include PDCCH or E-PDCCH, and may include PDSCH scheduled by PDCCH or E-PDCCH.

The UE allocates a PUCCH resource for transmitting ACK/NACK for the at least one DL subframe, and when a special subframe of a specific condition is included in the at least one DL subframe, it is excluded from the implicit PUCCH resource mapping (S120). The UL subframe through which the UE transmits ACK/NACK may be determined by Table 9.

Now, the steps of FIG. 20 will be described in detail.

PDCCH in TDD maps a PUCCH resource corresponding to PDCCH of M DL subframes as shown in Table 9 when the implicit PUCCH resource is mapped. However, the M values of Table 9 may include a special subframe through which PDSCH transmissions cannot be performed. For example, there may be special subframes corresponding to special subframe setting #0 and #5 and special subframes corresponding to special subframe #0 and #4 in the normal CP. As another example of not transmitting PDSCH, transmissions of DM-RS are not set to a special subframe when a special subframe setting #7 in an extension CP. Thus, E-PDCCH which demodulates based on DM-RS is not transmitted, and accordingly, transmissions of PDSCH by E-PDCCH is not generated.

In this case, setting of E-PDCCH and/or securing of an ACK/NACK resource wastes an area occupied by a PUCCH index, which may be unnecessary.

Accordingly, when the UE recognizes that the subframe is a special subframe of a specific condition as described above, the corresponding special sub-frame (that is, special subframe having specific special subframe configuration, a subframe to which the PDSCH is not transmitted, or a subframe in which DM-RS is not defined) may be excluded from E-PCCC configuration and/or E-PDCCH and implicit PUCCH resource mapping. Hereinafter, the special subframe is for the illustrative as an example of the particular subframe, but the embodiment is not limited thereto.

First, when one serving cell is set in the TDD, a procedure of transmitting ACK/NACK according to an applied example of the present invention will be described.

With respect to a PUCCH format 3 or a PUCCH format 1a/1b (ACK/NACK bundled mode), ACK/NACK transmission through two antenna ports $\{p_0, p_1\}$ may be supported. Alternatively, in the UE to support aggregation of the at least one serving cell, ACK/NACK transmission through two antenna ports may be set with respect to a PUCCH format 1b using a channel selection through a higher layer.

It is assumed that there is a PDSCH transmission indicated by detection of corresponding PDCCH/E-PDCCH or PDCCH/E-PDCCH exist in subframe n-k indicated by downlink SPS release. In this case, k is a component of a group K of table 9 and the group K has components of $\{k_0, k_1, \ldots, k_{M-1}\}$. In this case, if the subframe n-$k_m$ ($k_m \triangleq$ has the smallest value detecting the PDCCH/E-PDCCH in a group K by the UE) includes an E-PDCCH indicated by PDSCH transmission or downlink SPS release, the UE determines a PUCCH index as following equation 10 if E-PDCCH-PRB-group q with respect to distribution transmission is set.

$$n^{(1,\tilde{p}_0)}_{PUCCH} = n_{ECCE,q} + \sum_{i1=0}^{m-1} N_{ECCE,q,n-k_{i1}} + \Delta_{ARO} + N^{(e1)}_{PUCCH,q} \quad \text{[Equation 10]}$$

2) If the E-PDCCH-PRB-group q with respect to local transmission is set, the PUCCH index is determined by a following equation 11.

$$n^{(1,\tilde{p}_0)}_{PUCCH} = \left\lfloor \frac{n_{ECCE,q}}{N^{ECCE,q}_{RB}} \right\rfloor \cdot N^{ECCE,q}_{RB} + \sum_{i1=0}^{m-1} N_{ECCE,q,n-k_{i1}} + n' + \Delta_{ARO} + N^{(e1)}_{PUCCH,q} \quad \text{[Equation 11]}$$

In equation 11, the $n_{ECCE,q}$ represents a number of a first E-CCE used to transmit DCI allocation corresponding to the E-PDCCH-PRB-group q of a subframe n-$k_m$ and corresponding m. The $N^{(e1)}_{PUCCH,q}$ is set by the higher layer. $N_{ECCE,q,n-ki1}$ represents a the number of E-CCEs of the E-PDCCH-PRB-group q set to the subframe n-$k_{i1}$. The $\Delta_{ARO}$ is a value determined from a HARQ-ACK resource offset filed included in a DCI formation of a corresponding E-PDCCH.

In the normal CP, when the subframe n-$k_{i1}$ is a special subframe having a special subframe configuration #0, 5, $N_{ECCE,q,n-ki1}$ is 0. When the subframe n-$k_{i1}$ in an extended CP is a special subframe with a special subframe configuration, $N_{ECCE,q,n-ki1}$ is 0. That is, in the mapping of the E-CCE to the PUCCH resource, the special subframe is excluded by adjusting $N_{ECCE,q,n-ki1}$ with respect to a special subframe satisfying a specific condition as 0.

It is assumed that TDD ACK/NACK multiplexing is performed and there is a subframe n of M>1 and one set serving cell. In this case, it is assumed that a PUCCH resource induced from a subframe n−k_i is $n^{(1)}_{PUCCH,i}$.

In this case, there is a PDSCH transmission indicated by detection of a corresponding E-PDCCH or an E-PDCCH indicated by downlink SPS release is included in a subframe n−k_i (k_i is a component included in a group K of table 9), 1) If E-PDCCH-PRB-group q with respect to distribution transmission is set, a PUCCH index is determined by a following equation 12.

$$n^{(1)}_{PUCCH,i} = n_{ECCE,q} + \sum_{i1=0}^{i-1} N_{ECCE,q,n-k_{i1}} + \Delta_{ARO} + N^{(e1)}_{PUCCH,q}$$ [Equation 12]

Alternatively, 2) if E-PDCCH-PRB-group q with respect to local transmission is set, a PUCCH index is determined by a following equation 13.

$$n^{(1)}_{PUCCH,i} = \left\lfloor \frac{n_{ECCE,q}}{N^{ECCE,q}_{RB}} \right\rfloor \cdot N^{ECCE,q}_{RB} + \sum_{i1=0}^{i-1} N_{ECCE,q,n-k_{i1}} + n' + \Delta_{ARO} + N^{(e1)}_{PUCCH,q}$$ [Equation 13]

In the equation, the $n_{ECCE,q}$ represent a number of a first E-CCE used to transmit a DCI allocation corresponding to an E-PDCCH-PRB-group q of a subframe n−k_i. The $N^{(e1)}_{PUCCH,q}$ is set by the higher layer.

In the normal CP, when the subframe n−k_{i1} is a special subframe having a special subframe configuration #0, 5, $N_{ECCE,q,n-ki1}$ is 0. When the subframe n−k_{i1} in an extended CP is a special subframe with a special subframe configuration, $N_{ECCE,q,n-ki1}$ is 0. That is, in the mapping of the E-CCE to the PUCCH resource, the special subframe is excluded by adjusting $N_{ECCE,q,n-ki1}$ with respect to a special subframe satisfying a specific condition as 0.

In the same manner, the present invention is applicable to a case where a UE in which two serving cells using the UL-DL configuration transmits ACK/NACK using PUCCH format 1b using channel selection. Further, the present invention is applicable when ACK/NACK using a PUCCH format 3 is transmitted.

Presence of mapping of an implicit PUCCH resource of a corresponding special subframe may be indicated by setting the base station. Alternatively, the present invention is applicable to all special subframes.

<Method of Setting Two Resources to Set a Resource and Select a Channel for a Second Antenna Port for SORTD of E-PDCCH>

When PUCCH format 1/1a/1b is used, when the E-PDCCH is used, like the PDCCH as in the primary cell scheduling, an implicit PUCCH resource corresponding to an E-CCE occupied by the PDCCH may be used. That is a corresponding relation between the E-CCE and the PUCCH resource index are previously set, a resource a0 corresponding to the E-CCE is used as a PUCCH resource for the first antenna port. In this case, if the SORTD is set, a PUCCH resource a0' for a second antenna port uses a0+1 or allocates one explicit resource. The explicit resource may be indicated through RRC signaling.

When the PUCCH format 1b using channel selection being a single antenna transmission mode is used, and when the E-PDCCH is used, like the PDCCH as in the primary cell scheduling, an implicit PUCCH resource ax corresponding to an E-CCE occupied by the PDCCH may be used. When a cell using a transmission mode set to transmit two transmission blocks is included, two PUCCH resources from a corresponding cell are required to be ensured. In this case, a second resource uses ax+1 and the explicit resource is set through one RRC signal to be used.

Figure 21:
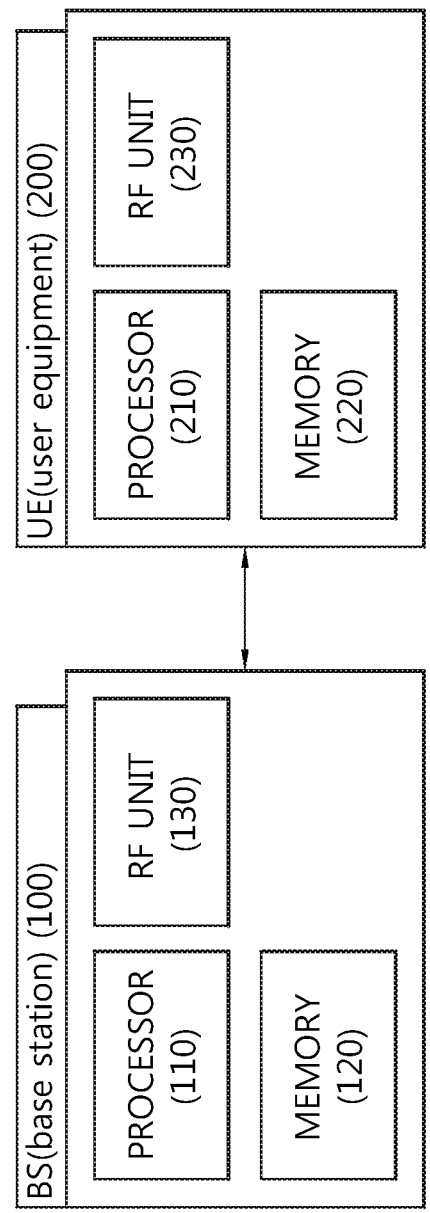
FIG. 21 illustrates configurations of a base station and a UE according to an embodiment of the present invention.

FIG. 21 illustrates configurations of a base station and UE according to the embodiment of the present invention.

The base station 100 includes a processor 110, a memory 120, a radio frequency (RF) unit 130. The processor 110 implements suggested function, procedure, and/or method. For example, the processor 110 transmits a PDSCH to the UE through at least one DL subframe, and receives ACK/NACK with respect to the PDSCH. In this case, a PUCCH resource receiving ACK/NACK is determined by the method descried with reference to FIG. 20. The memory 120 is connected to the processor 110 to store various information for driving the processor 110. The RF unit 130 is connected to the processor 110 to transmit/receive a wireless signal.

The UE 200 includes a processor 210, a memory 220, and an RF unit 230. The processor 210 implements suggested function, procedure, and/or method. For example, the processor 210 receives the PDSCH through at least one DL subframe, and transmits ACK/NACK with respect to the PDSCH. In this case, a PUCCH resource transmitting ACK/NACK is determined by the method descried with reference to FIG. 20. The memory 220 is connected to the processor 210 to store various information for driving the processor 110. The RF unit 230 is connected to the processor 210 to transmit/receive a wireless signal.

The processor 110 or 210 may include an ASIC (application-specific integrated circuit), a data processor and/or a converter to convert a baseband signal and a wireless signal into each other. The memory 120 or 220 may include a ROM (read-only memory), an RAM (random access memory), a flash memory, a memory card, a storage medium and/or other storage devices. The RF unit 130 or 203 may include at least one antenna to transmit and/or receive the wireless signal. When the embodiment is implemented by software, the above scheme may be implemented by a module (procedure, function, and the like) to perform the above function. The module is stored in the memory 120 or 120 and may be implemented by the processor 110 or 210. The memory 120 or 220 may be installed inside or outside the processor 110 or 210, and may be connected to the processor 110 or 210 through various known means.

What is claimed is:

1. A method for determining a resource for an uplink control channel in a wireless communication system, the method comprising:

receiving at least one downlink subframe; and determining a physical uplink control channel (PUCCH) resource for transmitting an acknowledgement/not-acknowledgement (ACK/NACK) for the at least one downlink subframe, wherein the PUCCH resource is determined on the basis of enhanced control channel elements (ECCEs) of an enhanced control channel for scheduling the at least one downlink subframe, wherein if a special subframe with a special subframe configuration 0 or 5 for normal downlink cyclic prefix (CP) is included in the at least one downlink subframe, ECCEs included in the special subframe are excluded from the ECCEs used to determine the PUCCH resource, and wherein the special subframe configuration 0 or 5 is expressed by the following table:

| Special subframe configuration | DwPTS | Normal cyclic prefix in downlink | |
|---|---|---|---|
| | | UpPTS | |
| | | Normal cyclic prefix in uplink | Extended cyclic prefix in uplink |
| 0 | 6592 · $T_s$ | 2192 · $T_s$ | 2560 · $T_s$ |
| 1 | 19760 · $T_s$ | | |
| 2 | 21952 · $T_s$ | | |
| 3 | 24144 · $T_s$ | | |
| 4 | 26336 · $T_s$ | | |
| 5 | 6592 · $T_s$ | 4384 · $T_s$ | 5120 · $T_s$ |
| 6 | 19760 · $T_s$ | | |
| 7 | 21952 · $T_s$ | | |
| 8 | 24144 · $T_s$ | | |
| 9 | 13168 · $T_s$ | | |

| Special subframe configuration | DwPTS | Extended cyclic prefix in downlink | |
|---|---|---|---|
| | | UpPTS | |
| | | Normal cyclic prefix in uplink | Extended cyclic prefix in uplink |
| 0 | 7680 · $T_s$ | 2192 · $T_s$ | 2560 · $T_s$ |
| 1 | 20480 · $T_s$ | | |
| 2 | 23040 · $T_s$ | | |
| 3 | 25600 · $T_s$ | | |
| 4 | 7680 · $T_s$ | 4384 · $T_s$ | 5120 · $T_s$ |
| 5 | 20480 · $T_s$ | | |
| 6 | 23040 · $T_s$ | | |
| 7 | 12800 · $T_s$ | | |
| 8 | — | — | — |
| 9 | — | — | — | wherein 307200·$T_s$=10 milli-second (ms).

2. The method of claim 1, wherein the enhanced control channel is an enhanced-physical downlink control channel (E-PDCCH) included in a data region of a downlink subframe.

3. The method of claim 1, wherein if a special subframe with a special subframe configuration 0, 4 or 7 for extended downlink cyclic prefix (CP) is included in the at least one downlink subframe, ECCEs included in the special subframe with a special subframe configuration 0, 4 or 7 for extended downlink cyclic prefix (CP) are excluded from the ECCEs used to determine the PUCCH resource.

4. The method of claim 1, wherein the enhanced control channel is demodulated based on a user equipment specific reference signal.

5. The method of claim 1, wherein, in the special subframe with a special subframe configuration 0 or 5 for normal downlink cyclic prefix (CP), a physical downlink shared channel (PDSCH) cannot be transmitted.

6. An apparatus for determining a resource for an uplink control channel in a wireless communication system, the apparatus comprising:

a radio frequency (RF) unit to transmit and receive a wireless signal; and a processor coupled to the RF unit, wherein the processor is configured for:

receiving at least one downlink subframe; and determining a physical uplink control channel (PUCCH) resource for transmitting an acknowledgement/not-acknowledgement (ACK/NACK) for the at least one downlink subframe, wherein the PUCCH resource is determined on the basis of enhanced control channel elements (ECCEs) of an enhanced control channel for scheduling the at least one downlink subframe, wherein if a special subframe with a special subframe configuration 0 or 5 for normal downlink cyclic prefix (CP) is included in the at least one downlink subframe, ECCEs included in the special subframe are excluded from the ECCEs used to determine the PUCCH resource, and wherein the special subframe configuration 0 or 5 is expressed by the following table:

| Special subframe configuration | DwPTS | Normal cyclic prefix in downlink | | Extended cyclic prefix in downlink | | |
|---|---|---|---|---|---|---|
| | | UpPTS | | | UpPTS | |
| | | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | wherein 307200·$T_s$=10 milli-second (ms).

7. The apparatus of claim 6, wherein the enhanced control channel is an enhanced-physical downlink control channel (E-PDCCH) included in a data region of a downlink subframe.

8. The apparatus of claim 6, wherein if a special subframe with a special subframe configuration 0, 4 or 7 for extended downlink cyclic prefix (CP) is included in the at least one downlink subframe, ECCEs included in the special subframe with a special subframe configuration 0, 4 or 7 for extended downlink cyclic prefix (CP) are excluded from the ECCEs used to determine the PUCCH resource.

9. The apparatus of claim 6, wherein the enhanced control channel is demodulated based on a user equipment specific reference signal.

10. The apparatus of claim 6, wherein, in the special subframe with a special subframe configuration 0 or 5 for normal downlink cyclic prefix (CP), a physical downlink shared channel (PDSCH) cannot be transmitted.

* * * * *